(12) United States Patent
Takatsuka et al.

(10) Patent No.: US 9,001,542 B2
(45) Date of Patent: Apr. 7, 2015

(54) CURRENT-SOURCE POWER CONVERTING APPARATUS

(71) Applicant: Kabushiki Kaisha Yaskawa Denki, Kitakyushu-shi (JP)

(72) Inventors: Yushi Takatsuka, Kitakyushu (JP); Katsutoshi Yamanaka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/775,255

(22) Filed: Feb. 25, 2013

(65) Prior Publication Data
US 2013/0229843 A1 Sep. 5, 2013

(30) Foreign Application Priority Data

Mar. 2, 2012 (JP) ................. 2012-046800

(51) Int. Cl.
*H02M 3/24* (2006.01)
*H02M 5/42* (2006.01)
*H02M 7/44* (2006.01)
*H02M 7/68* (2006.01)
*H02M 7/537* (2006.01)
*H02M 1/44* (2007.01)
*H02M 7/5387* (2007.01)
*H02M 1/12* (2006.01)

(52) U.S. Cl.
CPC .............. *H02M 7/537* (2013.01); *H02M 1/44* (2013.01); *H02M 7/5387* (2013.01); *H02M 2001/123* (2013.01)

(58) Field of Classification Search
CPC ..... H02M 1/44; H02M 7/53; H02M 7/53871; H02M 7/53873; H02M 7/53875; H02M 7/537; H02M 7/5387; H02M 7/42; H02M 7/48; H02M 7/5395; H02M 2001/0012; H02M 2001/123

USPC ............ 363/15–17, 55–56.05, 40, 41, 95–98, 363/109, 120, 131, 132, 137; 323/271–276, 323/282–285, 351; 318/400.26–400.28, 318/801, 811; 388/811, 812
See application file for complete search history.

(56) References Cited

U.S. PATENT DOCUMENTS 4,547,719 A * 10/1985 Sakamoto et al. ............ 318/723
2010/0117576 A1* 5/2010 Shimizu .................... 318/400.26

FOREIGN PATENT DOCUMENTS

JP 09-182458 7/1997

OTHER PUBLICATIONS

Japanese Office Action for corresponding JP Application No. 2012-046800, Dec. 24, 2013.
Chinese Office Action for corresponding CN Application No. 201310065298.X, Nov. 2, 2014.

* cited by examiner

*Primary Examiner* — Timothy J Dole
*Assistant Examiner* — Carlos Rivera-Perez
(74) *Attorney, Agent, or Firm* — Mori & Ward, LLP

(57) ABSTRACT

A current-source power converting apparatus according to an embodiment includes an inverter and a drive controller. The inverter includes, in every output phase, a plurality of switching elements that are serially connected between the positive pole and the negative pole of a direct current source. The drive controller controls the inverter in accordance with a current command in an output mode of controlling the switching elements of different output phases for supplying current between the output phases and a short circuit mode of controlling the switching elements of the same output phase. An output phase in which the drive controller executes the short circuit mode is an output phase whose phase voltage or phase current has the minimum absolute value.

11 Claims, 21 Drawing Sheets

| REGION | FIRST ZERO VECTOR | SECOND ZERO VECTOR |
|--------|-------------------|--------------------|
| REGION A | Ivv | Iww |
| REGION B | Ivv | Iuu |
| REGION C | Iww | Iuu |
| REGION D | Iww | Ivv |
| REGION E | Iuu | Ivv |
| REGION F | Iuu | Iww |

| REGION | FIRST ZERO VECTOR | SECOND ZERO VECTOR | THIRD ZERO VECTOR |
|---|---|---|---|
| REGION A | Ivv | Iww | Iuu |
| REGION B | Ivv | Iuu | Iww |
| REGION C | Iww | Iuu | Ivv |
| REGION D | Iww | Ivv | Iuu |
| REGION E | Iuu | Ivv | Iww |
| REGION F | Iuu | Iww | Ivv |

US 9,001,542 B2

CURRENT-SOURCE POWER CONVERTING APPARATUS

CROSS-REFERENCE TO RELATED APPLICATIONS

The present disclosure contains subject matter related to that disclosed in Japanese Priority Patent Application JP 2012-046800 filed in the Japan Patent Office on Mar. 2, 2012, the entire contents of which are hereby incorporated by reference.

BACKGROUND OF THE INVENTION

1. Field of the Invention

The disclosed embodiments relate to a current-source power converting apparatus.

2. Description of the Related Art

Hitherto, current-source power converting apparatuses that drive switching elements on the basis of current commands have been available. For example, a current-source power converting apparatus described in Japanese Unexamined Patent Application Publication No. 9-182458 compares current commands corresponding to three different inter-phases (UW-phase, VU-phase, and WV-phase) with a carrier signal and generates pulse-width modulated (PWM) pulse signals of the three different inter-phases. The current-source power converting apparatus generates drive signals for switching elements by using the logical product of one of the generated PWM pulse signals of the three different inter-phases and the negated signal of another one of the PWM pulse signals.

SUMMARY OF THE INVENTION

A current-source power converting apparatus according to an aspect of the embodiments includes an inverter and a drive controller. The inverter includes, in every output phase, a plurality of switching elements that are serially connected between a positive pole and a negative pole of a direct current source. The drive controller controls the inverter in accordance with a current command in an output mode of controlling the switching elements of different output phases for supplying current between the output phases and a short circuit mode of controlling the switching elements of the same output phase. It is in an output phase whose voltage or current has the minimum absolute value among the output phases that the drive controller executes the short circuit mode.

DESCRIPTION OF THE EMBODIMENTS

Hereinafter, embodiments of a current-source power converting apparatus disclosed by the present application will be described in detail with reference to the accompanying drawings. Note that this technology is not limited by the following embodiments.

First Embodiment

Figure 1:
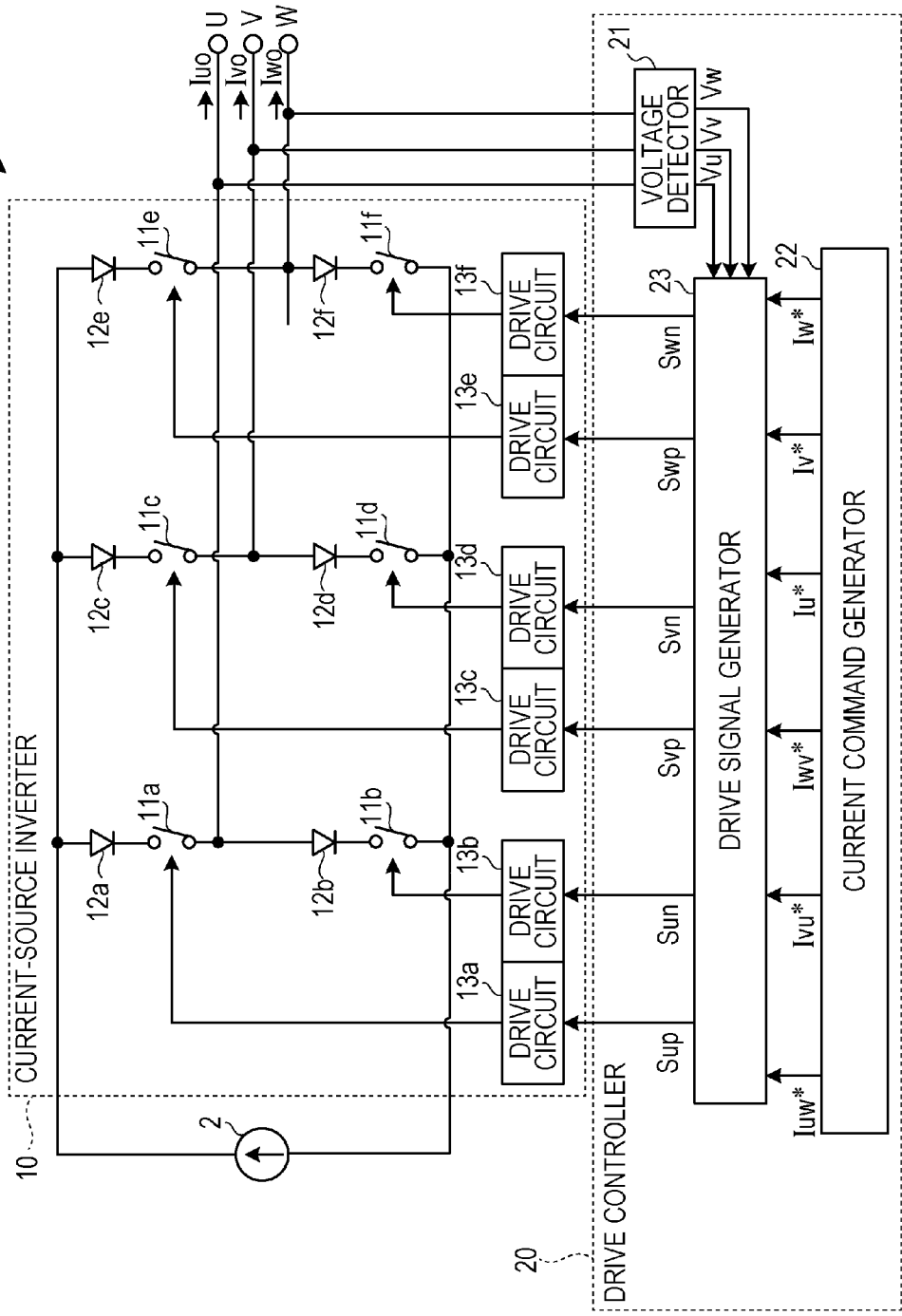
FIG. 1 is a diagram illustrating the configuration of a current-source power converting apparatus according to a first embodiment.

At first, a current-source power converting apparatus according to a first embodiment will be described. FIG. 1 is a diagram illustrating the configuration of the current-source power converting apparatus according to the first embodiment.

As illustrated in FIG. 1, a current-source power converting apparatus 1 according to the first embodiment includes a current-source inverter 10 and a drive controller 20 that controls the current-source inverter 10. The current-source power converting apparatus 1 converts direct power supplied from a direct current source 2 to alternating power by using the current-source inverter 10, and outputs the alternating power to U-phase, V-phase, and W-phase connected to loads. The loads include, for example, motors. In the example illustrated in FIG. 1, the direct current source 2 is provided outside the current-source inverter 10; alternatively, the direct current source 2 may be provided in the current-source inverter 10.

The current-source inverter 10 includes six switching elements 11a to 11f, six rectifying elements 12a to 12f, and six drive circuits 13a to 13f for driving the switching elements 11a to 11f. Note that, in the following description, the switching elements 11a to 11f may be collectively referred to as switching elements 11. Also, the rectifying elements 12a to 12f may be collectively referred to as rectifying elements 12.

In the current-source inverter 10, three bridge circuits, each having two series-connected switching elements 11, are connected in parallel between the positive pole and the negative pole of the direct current source 2. A reverse-blocking rectifying element 12 is connected in series to each switching element 11. A U-phase terminal is connected between the series-connected switching elements 11a and 11b. A V-phase terminal is connected between the series-connected switching elements 11c and 11d. A W-phase terminal is connected between the series-connected switching elements 11e and 11f.

The switching elements 11 are switching elements, such as insulated gate bipolar transistors (IGBTs) or metal-oxide-semiconductor field-effect transistors (MOS-FETs), which are turned on/off in response to switch drive signals. Note that, instead of the rectifying elements 12 and the switching elements 11 including IGBTs, reverse-blocking IGBTs may be used.

The drive controller 20 includes a voltage detector 21, a current command generator 22, and a drive signal generator 23. The drive controller 20 generates switch drive signals Sup, Sun, Svp, Svn, Swp, and Swn to be input to control terminals of the switching elements 11a to 11f, respectively.

The voltage detector 21 detects each of phase voltages (may be described below as the voltage of each phase) of the U-phase, V-phase, and W-phase, which are output phases, and outputs detected phase voltages Vu, Vv, and Vw to the drive signal generator 23. The detected phase voltage Vu is an instantaneous value of the voltage (hereinafter described as a "voltage instantaneous value") of the U-phase terminal. The detected phase voltage Vv is the voltage instantaneous value of the V-phase terminal. The detected phase voltage Vw is the voltage instantaneous value of the W-phase terminal.

The current command generator 22 simultaneously outputs phase current commands Iu*, Iv*, and Iw* corresponding to the individual output phases including the U-phase, V-phase, and W-phase, and line to line current commands Iuw*, Ivu*, and Iwv* corresponding to three different output inter-phases (UW-phase, VU-phase, and WV-phase). The relationships between the phase current commands Iu*, Iv*, and Iw* and the line to line current commands Iuw*, Ivu*, and Iwv* are represented by the following equations (1) to (3):

$$Iuw^* = \frac{1}{3}(Iu^* - Iw^*) \quad (1)$$

$$Ivu^* = \frac{1}{3}(Iv^* - Iu^*) \quad (2)$$

$$Iwv^* = \frac{1}{3}(Iw^* - Iv^*) \quad (3)$$

Figure 2:
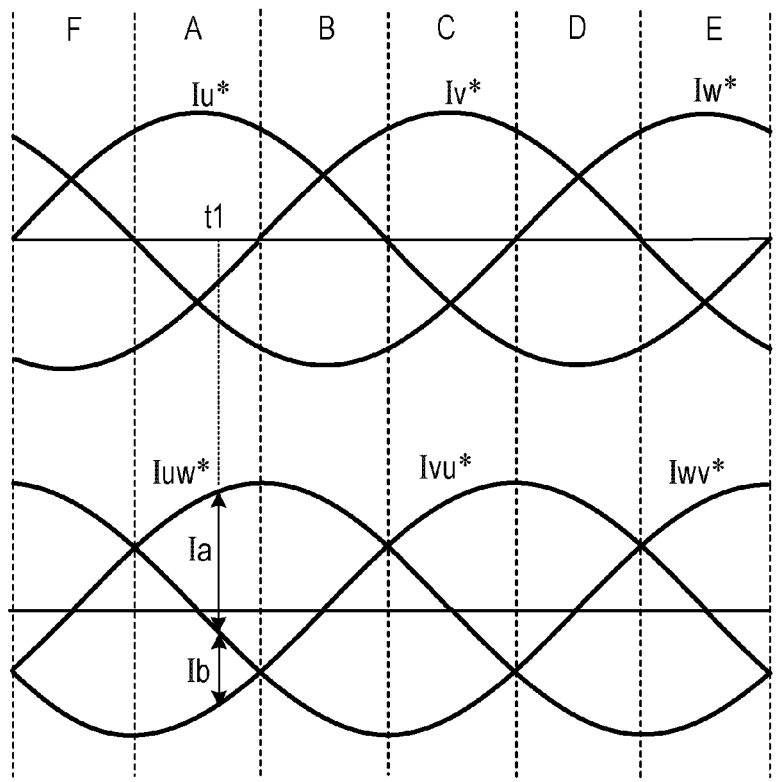
FIG. 2 is a chart illustrating the relationship between phase current commands and line to line current commands.

FIG. 2 is a chart illustrating the relationship between the phase current commands Iu*, Iv*, and Iw* and the line to line current commands Iuw*, Ivu*, and Iwv*. In FIG. 2, one cycle of each current command is illustrated as being divided into six regions including regions A to F at every 60 electrical degrees. The region A is a region in which the phase current command Iu* reaches a positive peak value. The region B is a region in which the phase current command Iw* reaches a negative peak value. The region C is a region in which the phase current command Iv* reaches a positive peak value. The region D is a region in which the phase current command Iu* reaches a negative peak value. The region E is a region in which the phase current command Iw* reaches a positive peak value. The region F is a region in which the phase current command Iv* reaches a negative peak value.

The drive signal generator 23 obtains the line to line current commands Iuw*, Ivu*, and Iwv* and the phase current commands Iu*, Iv*, and Iw* from the current command generator 22, and further obtains the detected phase voltages Vu, Vv, and Vw from the voltage detector 21. On the basis of these obtained pieces of information, the drive signal generator 23 generates switch drive signals Sup, Sun, Svp, Svn, Swp, and Swn by using space vector modulation.

Figure 3:
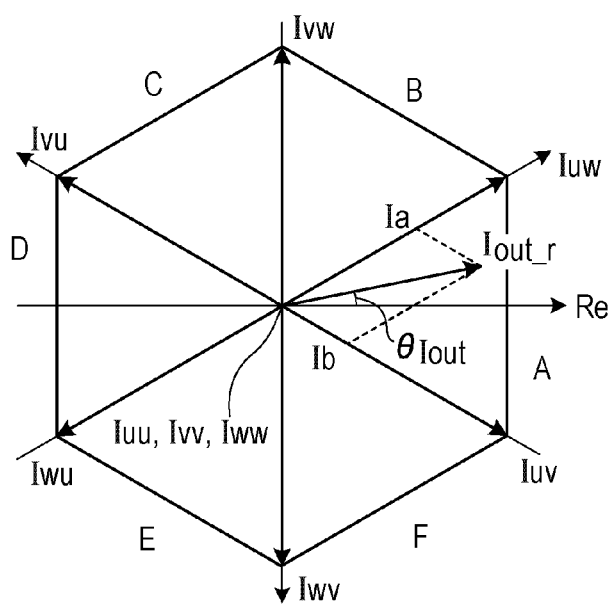
FIG. 3 is a chart for describing space vector modulation.

FIG. 3 is a chart for describing the space vector modulation. In FIG. 3, nine current vectors Iuv, Iuw, Ivw, Ivu, Iwu, Iwv, Iuu, Ivv, and Iww in the space vector modulation are illustrated. The drive signal generator 23 outputs switch drive signals Sup, Sun, Svp, Svn, Swp, and Swn in accordance with these current vectors. Hereinafter, in order to simplify the description, outputting the switch drive signals in accordance with the current vectors may be described as outputting the current vectors.

Among the nine current vectors, the current vectors Iuv, Iuw, Ivw, Ivu, Iwu, and Iwv are current vectors corresponding to current flowing between different output phases. Also, the current vectors Iuu, Ivv, and Iww are current vectors each corresponding to one output phase, which are current vectors of zero amplitude. Hereinafter, current vectors corresponding to current flowing between different phases may be described as "effective vectors", and current vectors of zero amplitude corresponding to one output phase may be described as "zero vectors".

The drive signal generator 23 determines in which of the regions A to F (see FIG. 2) the phase state of the phase current commands Iu*, Iv*, and Iw* resides. The drive signal generator 23 outputs two effective vectors that are adjacent to the determined region, and a zero vector adjacent to these effective vectors. This output state is represented as a current command vector $I_{out\_r}$ in FIG. 3. In order to output current represented by the current command vector $I_{out\_r}$, the drive signal generator 23 adjusts the time for outputting the zero vector and the two effective vectors.

A vector Ia illustrated in FIG. 3 represents a component of the current command vector $I_{out\_r}$ on Iuw vector direction, and a vector Ib represents a component of the current command vector $I_{out\_r}$ on Iuv vector direction. The current command vector $I_{out\_r}$ illustrated in FIG. 3 is the current command vector at time t1 illustrated in FIG. 2. When it is assumed that the magnitudes of the current vectors Iuw, Ivw, Ivu, Iwu, Iwv, and Iuv are equal to the current value of the direct current source 2, the magnitudes of the vectors Ia and Ib illustrated in FIG. 3 coincide with scalar amounts Ia and Ib illustrated in FIG. 2.

In the drive signal generator 23, pulse width modulation (PWM) is used to generate the current command vector $I_{out\_r}$. For example, when it is assumed that the control period of PWM is T, the current value of the direct current source 2 is IL, a time during which one of the two effective vectors is output is Ta, and a time during which the other effective vector is output is Tb, Ta and Tb are determined by the following equations (4) and (5):

$$Ta = T \times \frac{Ia}{IL} \quad (4)$$

$$Tb = T \times \frac{Ib}{IL} \quad (5)$$

In the control period T, the drive signal generator 23 outputs one of the effective vectors for the time Ta, outputs the other effective vector for the time Tb, and outputs the zero vector for the remaining time Tc (=T−Ta−Tb) of the control period T.

For example, in the case of the current command vector $I_{out\_r}$ at time t1 illustrated in FIG. 2, the drive signal generator 23 outputs the current vector Iuw for the time Ta, outputs the current vector Iuv for the time Tb, and outputs the zero vector for the remaining control time Tc.

The drive signal generator 23 is configured to be capable of selecting, as the zero vector forming the current command vector $I_{out\_r}$, a zero vector which generates the minimum amplitude of a common mode voltage. Accordingly, the amplitude of a common mode voltage generated by the current-source power converting apparatus 1 can be reduced. Hereinafter, reduction of the amplitude of the common mode voltage will be specifically described.

In the current-source inverter 10, when the switching elements 11a to 11f are all turned off, current from the direct current source 2 to the loads is cut off. Since the direct current source 2 has a large inductance, overvoltage is caused when current from the direct current source 2 is cut off.

To this end, the drive signal generator 23 has a short circuit mode of outputting a zero vector, in addition to an output mode of outputting an effective vector. Accordingly, the current passage of the direct current source 2 is secured, and the occurrence of overvoltage is prevented.

Figure 4:
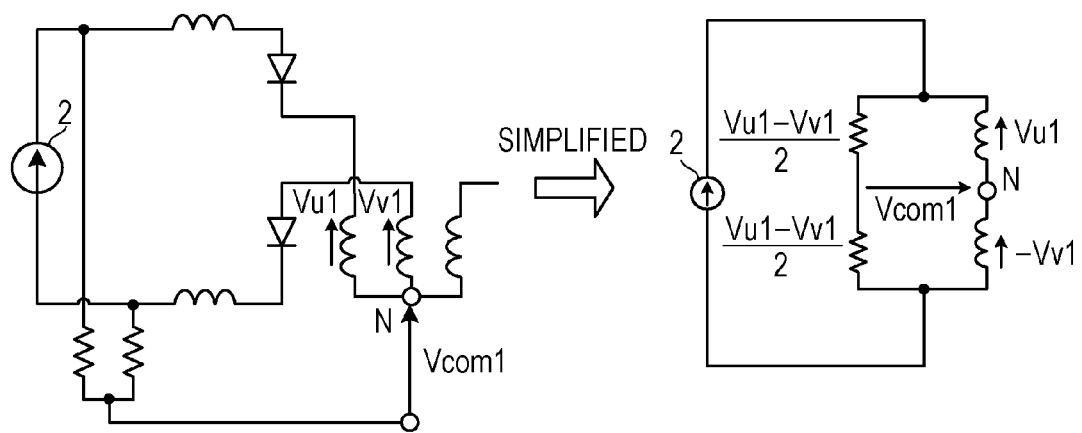
FIG. 4 is an explanatory diagram of a common mode voltage in an output mode.

Here, the common mode voltage in the output mode and the common mode voltage in the short circuit mode will be described. FIG. 4 is an explanatory diagram of the common mode voltage in the output mode.

In the case of the output mode of outputting the effective vector Iuv corresponding to current flowing between the U-phase and the V-phase, as illustrated at the left of FIG. 4, a U-phase voltage Vu1 is applied between a neutral point N of the load and the U-phase, and a V-phase voltage Vv1 is applied between the neutral point N and the V-phase.

The voltage at the neutral point N is a potential difference between the load and the grounding point to which each of the positive pole and the negative pole of the direct current source 2 is connected via resistance R. Therefore, a circuit at the left of FIG. 4 can be considered as simplified as a circuit illustrated at the right of FIG. 4.

From FIG. 4, a common mode voltage Vcom1 in the output mode of outputting the effective vector Iuv can be represented as indicated in equation (6) below. It is assumed that the sum of the U-phase voltage Vu1, V-phase voltage Vv1, and W-phase voltage Vw1 is zero.

$$Vcom1 = \left(\frac{Vu1 - Vv1}{2}\right) - Vu1 \quad (6)$$
$$= -\left(\frac{Vu1 + Vv1}{2}\right)$$
$$= \frac{Vw1}{2}$$

Therefore, the common mode voltage Vcom1 in the output mode of causing current to flow between the U-phase and the V-phase is half the magnitude of the W-phase voltage Vw1. Accordingly, the common mode voltage Vcom1 in the output mode is a voltage value half the voltage instantaneous value of the phase other than the two phases between which current is caused to flow.

Figure 5:
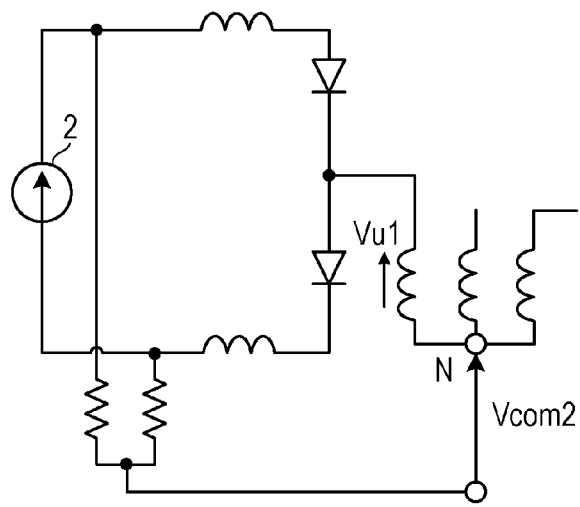
FIG. 5 is an explanatory diagram of a common mode voltage in a short circuit mode.

FIG. 5 is an explanatory diagram of the common mode voltage in the short circuit mode. As illustrated in FIG. 5, in the case of the short circuit mode of outputting the zero vector Iuu corresponding to the U-phase, the switching elements 11a and 11b are turned on, and the U-phase voltage Vu1 is applied between the neutral point N of the motor and the U-phase. On the contrary, no voltage is applied between the neutral point N and the V-phase or the W-phase.

Therefore, in the case of the short circuit mode of outputting the zero vector Iuu, a common mode voltage Vcom2 has the same magnitude as that of the U-phase voltage Vu1. The same applies to the short circuit mode of outputting the zero vector Ivv or Iww. Accordingly, in the short circuit mode, the voltage instantaneous value of a short-circuited phase becomes the voltage value of the common mode voltage Vcom2. Thus, the short circuit mode generates a common mode voltage which has a larger absolute value than that in the output mode.

Therefore, in the current-source power converting apparatus 1, it is effective to reduce the common mode voltage in the short circuit mode in order to reduce the common mode voltage. In the short circuit mode, in whatever phase of the U-phase, V-phase, or W-phase the zero vector is output, the output current of the current-source inverter 10 is unaffected. Therefore, in the current-source power converting apparatus 1, a phase whose phase voltage has the minimum absolute value among the U-phase, V-phase, and W-phase is selected as a phase in which a zero vector is output.

Specifically, on the basis of the detected phase voltages Vu, Vv, and Vw input from the voltage detector 21, the drive signal generator 23 determines the phase whose phase voltage has the minimum absolute value, and selects a zero vector corresponding to this phase. Accordingly, the common mode voltage Vcom2 can be reduced, and fluctuations of the common mode voltage in transition from the short circuit mode to the output mode can be decreased.

Also, the drive signal generator 23 can change the process of selecting a zero vector in accordance with a voltage output from the current-source inverter 10 (hereinafter may be described as the output voltage). For example, when the amplitude of the output voltage is relatively large, the drive signal generator 23 selects a zero vector whose corresponding phase has the phase voltage with the minimum absolute value; otherwise, the drive signal generator 23 selects a zero vector predetermined using the space vector modulation.

Hereinafter, it is assumed that the way of selecting a zero vector is changed in accordance with the amplitude of the output voltage. Alternatively, a zero vector whose corresponding phase has the minimum absolute value of the phase voltage may be always selected regardless of the amplitude of the output voltage.

Figure 6:
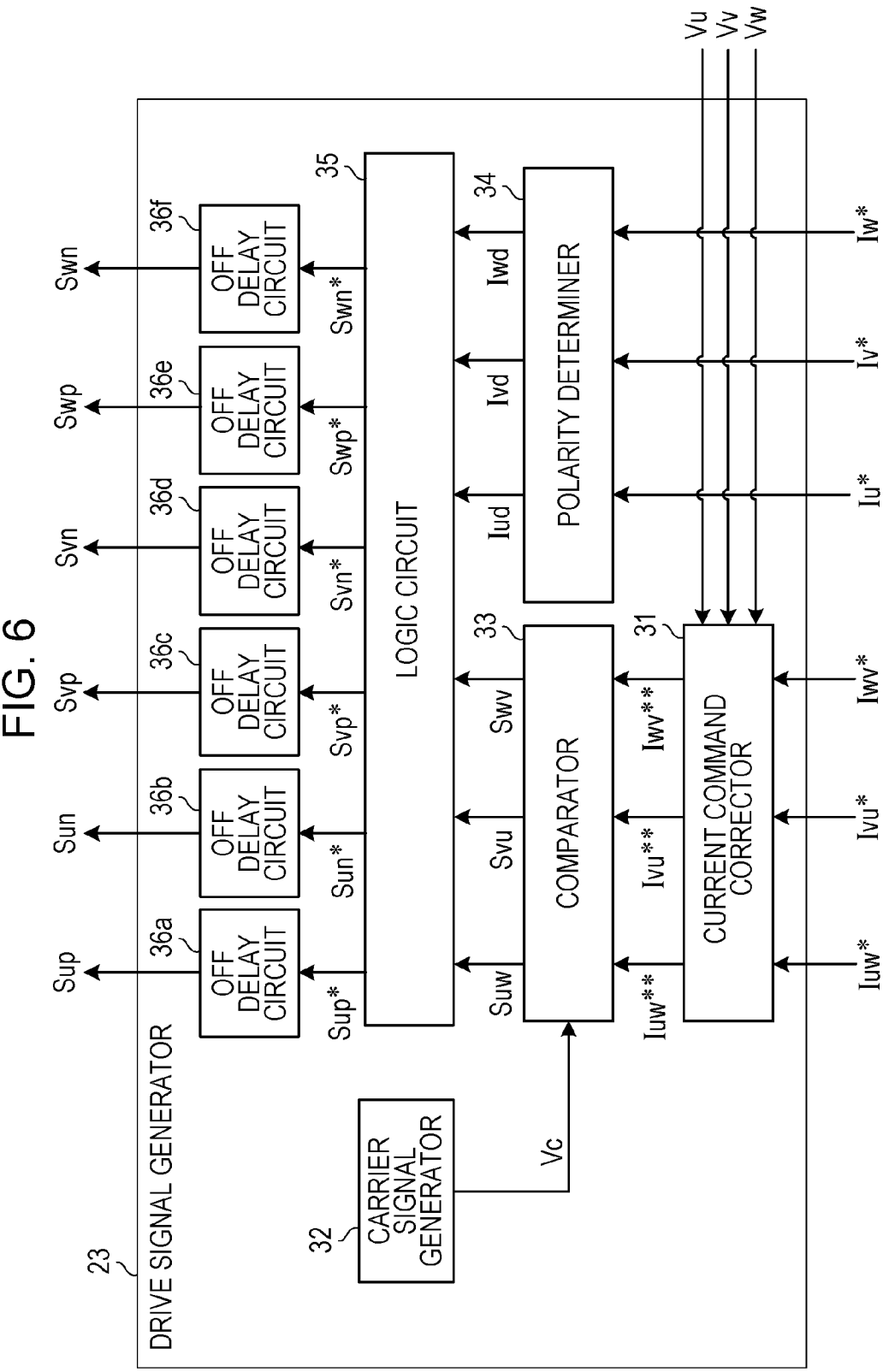
FIG. 6 is a diagram illustrating an example of the configuration of a drive signal generator.

Hereinafter, the configuration of the drive signal generator 23 will be further specifically described. FIG. 6 is a diagram illustrating an example of the configuration of the drive signal generator 23.

As illustrated in FIG. 6, the drive signal generator 23 includes a current command corrector 31, a carrier signal generator 32, a comparator 33, a polarity detector 34, a logic circuit 35, and six off delay circuits 36a to 36f. Note that the logic circuit 35 corresponds to an example of a signal generator.

The current command corrector 31 corrects the line to line current commands Iuw*, Ivu*, and Iwv* input from the current command generator 22, on the basis of the detected phase voltage Vu, Vv, and Vw, input from the voltage detector 21, and generates corrected line to line current commands Iuw, Ivu, and Iwv**. Also, when the current command corrector 31 recognizes on the basis of the detected phase voltage Vu, Vv, and Vw that the amplitude of the output voltage is less than a certain value, the current command corrector 31 outputs the line to line current commands Iuw*, Ivu*, and Iwv* as the corrected line to line current commands Iuw, Ivu, and Iwv** to the comparator 33.

Figure 7:
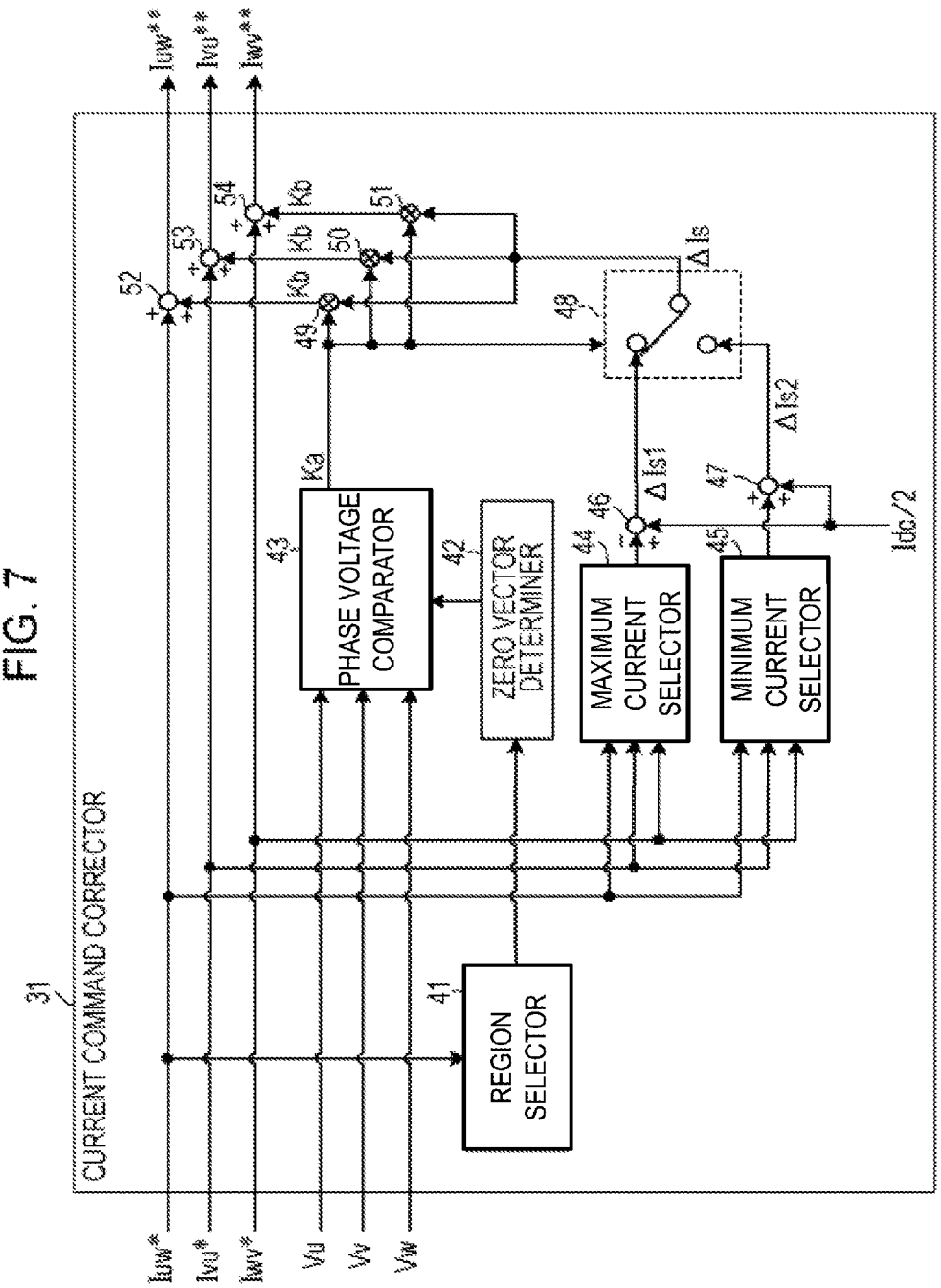
FIG. 7 is a diagram illustrating an example of a current command corrector.

FIG. 7 is a diagram illustrating an example of the configuration of the current command corrector 31. The current command corrector 31 illustrated in FIG. 7 includes a region selector 41, a zero vector determiner 42, a phase voltage comparator 43, a maximum current selector 44, a minimum current selector 45, a subtractor 46, adders 47 and 52 to 54, a switch 48, and multipliers 49 to 51. Note that the phase voltage comparator 43 corresponds to an example of a determiner and an output amplitude determiner.

The region selector 41 selects, among the regions A to F (see FIG. 2), a region corresponding to the phase state of the line to line current commands Iuw*, Ivu*, and Iwv*. The region selector 41 selects the region on the basis of the phase angle of the line to line current command Iuw*. Note that the region selection by the region selector 41 may be performed on the basis of the phase angle of any of the line to line current commands Ivu* and Iwv* and the phase current commands Iu*, Iv*, and Iw* or on the basis of the phase angle $\theta_{I_{out}}$ of the current command vector $I_{out\_r}$ (see FIG. 3).

The zero vector determiner 42 determines, on the basis of a zero vector table set therein, two zero vectors corresponding to the region selected by the region selector 41, and reports the selection result to the phase voltage comparator 43. The zero vector determiner 42 determines a first zero vector and a second zero vector as the two zero vectors. The first zero vector is a zero vector selected when a carrier signal Vc described later is less than all the corrected line to line current commands Iuw, Ivu, and Iwv. The second zero vector is a zero vector selected when the carrier signal Vc is larger than all the corrected line to line current commands Iuw, Ivu, and Iwv. One of the first zero vector and the second zero vector is a zero vector corresponding to an output phase with the minimum voltage. Note that a phase outputting the first zero vector is an example of a first output phase, and a phase outputting the second zero vector is an example of a second output phase.

Figures 8, 9:
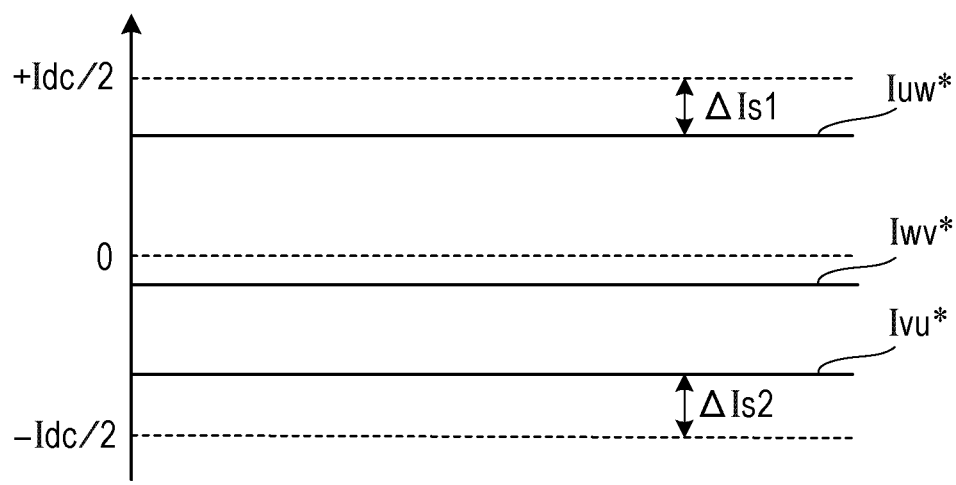
FIG. 8 is a diagram illustrating an example of a determination table.
FIG. 9 is a chart for describing the relationship among the line to line current commands, a first offset, and a second offset.

FIG. 8 is a diagram illustrating an example of the zero vector table. For example, when the region selected by the region selector 41 is the region A, the zero vector determiner 42 determines, on the basis of the zero vector table illustrated in FIG. 8, that the first zero vector is the current vector Ivv, and the second zero vector is the current vector Iww. Although the example that the zero vectors are determined using the zero vector table has been described here, the zero vectors may be determined using, for example, a logic circuit or the like.

The phase voltage comparator 43 outputs a comparison result Ka based on the detected phase voltage Vu, Vv, and Vw to the switch 48 and the multipliers 49 to 51. When the amplitude of a phase voltage is less than a certain value, the phase voltage comparator 43 outputs the comparison result Ka of "0". Note that the amplitude of the phase voltage is detected on the basis of at least one of the detected phase voltages Vu, Vv, and Vw.

On the contrary, when the amplitude of the phase voltage is larger than or equal to the certain value, the phase voltage comparator 43 compares the detected phase voltages of the phases corresponding to the first zero vector and the second zero vector. When the detected phase voltage corresponding to the first zero vector is less than the detected phase voltage corresponding to the second zero vector, the phase voltage comparator 43 outputs the comparison result Ka of "+1". Otherwise, the phase voltage comparator 43 outputs the comparison result Ka of "−1".

For example, when the first zero vector is the current vector Ivv and the second zero vector is the current vector Iww, the phase corresponding to the first zero vector is the V-phase, and the phase corresponding to the second zero vector is the W-phase. In this case, the phase voltage comparator 43 outputs the comparison result Ka of "+1" when the detected phase voltage Vv is less than the detected phase voltage Vw. Otherwise, the phase voltage comparator 43 outputs the comparison result Ka of "−1".

The maximum current selector 44 selects and outputs the line to line current command whose value is the maximum (hereinafter described as the maximum line to line current command) out of the line to line current commands Iuw*, Ivu*, and Iwv* input from the current command generator 22. For example, in the region A, as illustrated in FIG. 2, the maximum line to line current command is the line to line current command Iuw*, and the maximum current selector 44 selects and outputs the line to line current command Iuw* as the maximum line to line current command.

The subtractor 46 subtracts the maximum line to line current command, output from the maximum current selector 44, from a current value Idc/2 and generates a first offset ΔIs1. The subtractor 46 outputs the first offset ΔIs1 to the switch 48. Note that the current value Idc/2 is half the current value Idc of the DC current source 2.

The minimum current selector 45 selects and outputs the line to line current command whose value is the minimum (hereinafter described as the minimum line to line current command) out of the line to line current commands Iuw*, Ivu*, and Iwv* input from the current command generator 22. For example, in the region A, as illustrated in FIG. 2, the minimum line to line current command is the line to line current command Ivu*, and the minimum current selector 45 selects and outputs the line to line current command Ivu* as the minimum line to line current command.

The adder 47 adds the current value Idc/2 to the minimum line to line current command output from the minimum current selector 45 and generates a second offset ΔIs2. The adder 47 outputs the second offset ΔIs2 to the switch 48.

FIG. 9 is a chart for describing the relationship among the line to line current commands Iuw*, Ivu*, and Iwv*, the first offset ΔIs1, and the second offset ΔIs2. When the line to line current commands Iuw*, Ivu*, and Iwv* are in a state illustrated in FIG. 9, the maximum line to line current command is the line to line current command Iuw*.

Therefore, the first offset ΔIs1 is a value obtained by subtracting the line to line current command Iuw* from the current value Idc/2. Also, the minimum line to line current command is the line to line current command Ivu*. Therefore, the second offset ΔIs2 is a value obtained by adding the current value Idc/2 to the line to line current command Ivu*.

Referring back to FIG. 7, the configuration of the current command corrector 31 will be continuously described. The switch 48 selects one of the first offset ΔIs1 and the second offset ΔIs2 on the basis of the comparison result Ka input from the phase voltage comparator 43. The switch 48 outputs the selected offset as an offset ΔIs to the multipliers 49 to 51.

Specifically, the switch 48 outputs the first offset ΔIs1 to the multipliers 49 to 51 when the comparison result Ka input from the phase voltage comparator 43 is "+1". On the contrary, the switch 48 outputs the second offset ΔIs2 to the multipliers 49 to 51 when the comparison result Ka input from the phase voltage comparator 43 is "−1".

The multipliers 49 to 51 multiply the offset ΔIs, input from the switch 48, and the comparison result Ka, input from the phase voltage comparator 43, and output a product Kb (=Ka× ΔIs) to the adders 52 to 54. For example, when the comparison result Ka input from the phase voltage comparator 43 is "+1", the multipliers 49 to 51 output the product Kb (=ΔIs1) having the same value as the first offset ΔIs.

On the contrary, when the comparison result Ka input from the phase voltage comparator 43 "−1", the multipliers 49 to 51 output the product Kb (=−ΔIs) having the inverted sign (polarity) of the second offset ΔIs2. Also, when the comparison result Ka input from the phase voltage comparator 43 is "0", the multipliers 49 to 51 output the product Kb having the zero value.

The adders 52 to 54 add the product Kb, output from the multipliers 49 to 51, to the line to line current commands, input from the current command generator 22, and output the addition results as corrected line to line current commands to the comparator 33. Specifically, the adder 52 generates the corrected line to line current command Iuw** by adding the product Kb, output from the multiplier 49, to the line to line current command Iuw*, and outputs the corrected line to line current command Iuw** to the comparator 33.

Also, the adder 53 generates the corrected line to line current command Ivu** by adding the product Kb, output from the multiplier 50, to the line to line current command Ivu*, and outputs the corrected line to line current command Ivu to the comparator 33. Also, the adder 54 generates the corrected line to line current command Iwv by adding the product Kb, output from the multiplier 51, to the line to line current command Iwv*, and outputs the corrected line current to line command Iwv** to the comparator 33.

Figure 10A:
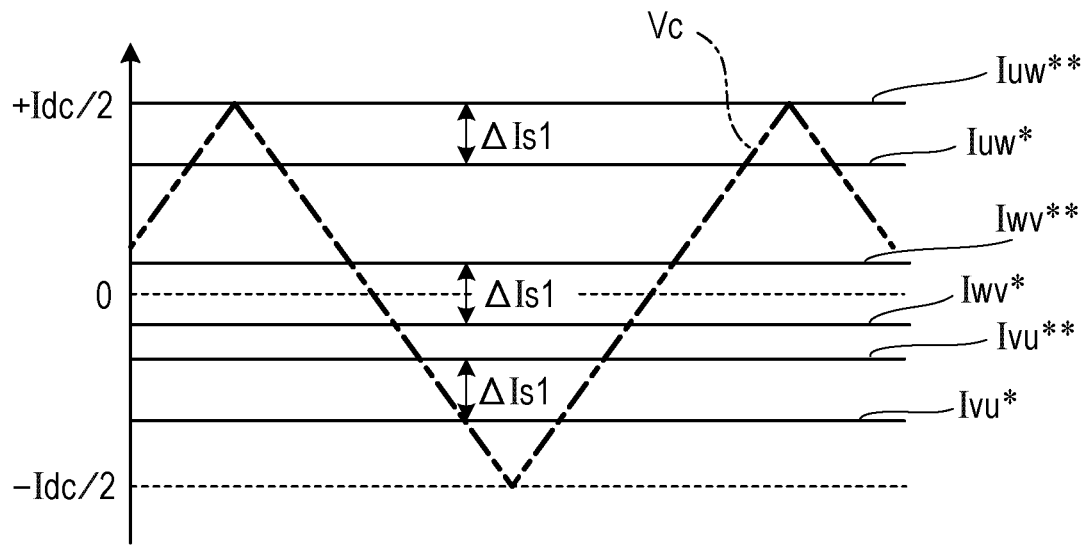
FIG. 10A is a chart illustrating the relationship between the line to line current commands and corrected line to line current commands.
Figure 10B:
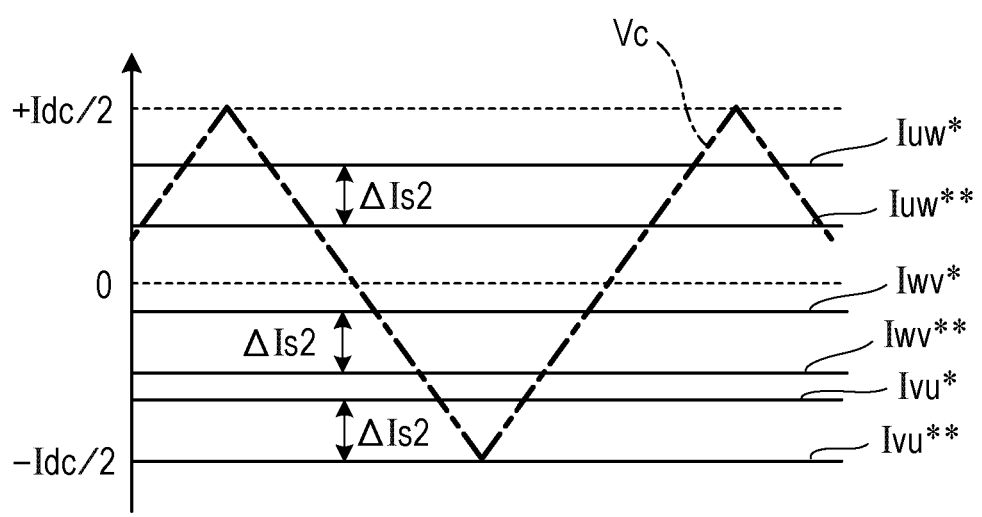
FIG. 10B is a chart illustrating the relationship between the line to line current commands and the corrected line to line current commands.

FIGS. 10A and 10B are charts illustrating the relationship between the line to line current commands Iuw*, Ivu*, and Iwv* and the corrected line to line current commands Iuw, Ivu, and Iwv. When the comparison result Ka obtained by the phase voltage comparator 43 is "+1", as illustrated in FIG. 10A, the corrected line to line current commands Iuw, Ivu, and Iwv are values obtained by adding the first offset ΔIs1 to the line to line current commands Iuw*, Ivu*, and Iwv*. In this manner, the current command corrector 31 generates the corrected line to line current commands Iuw, Ivu, and Iwv** by increasing the line to line current commands Iuw*, Ivu*, and Iwv* until the line to line current command whose value is the maximum among the line to line current commands Iuw*, Ivu*, and Iwv* becomes equal to the peak value of the carrier signal Vc.

Also, when the comparison result Ka obtained by the phase voltage comparator 43 is "−1", as illustrated in FIG. 10B, the corrected line to line current commands Iuw, Ivu, and Iwv** are values obtained by subtracting the second offset ΔIs2 from the line to line current commands Iuw*, Ivu*, and Iwv*. In this manner, the current command corrector 31 generates the corrected line to line current commands Iuw, Ivu, and Iwv** by decreasing the line to line current commands Iuw*, Ivu*, and Iwv* until the line to line current command whose value is the minimum among the line to line current commands Iuw*, Ivu*, and Iwv* becomes equal to the bottom value of the carrier signal Vc.

On the contrary, when the amplitude of the phase voltage is less than the certain value, the comparison result Ka obtained by the phase voltage comparator 43 is "0". Thus, the corrected line to line current commands Iuw, Ivu, and Iwv** have the same values as the line to line current commands Iuw*, Ivu*, and Iwv*.

Referring back to FIG. 6, the configuration of the drive signal generator 23 will be continuously described. The carrier signal generator 32 generates the carrier signal Vc and outputs the carrier signal Vc to the comparator 33. The comparator 33 compares the corrected line to line current commands Iuw, Ivu, and Iwv** with the carrier signal Vc, and generates PWM pulse signals Suw, Svu, and Swv.

The comparator 33 outputs the generated PWM pulse signals Suw, Svu, and Swv to the logic circuit 35. Although the carrier signal Vc is a triangular signal here, the carrier signal Vc is not limited to this. Alternatively, the carrier signal Vc may be a sawtooth wave.

Figure 11:
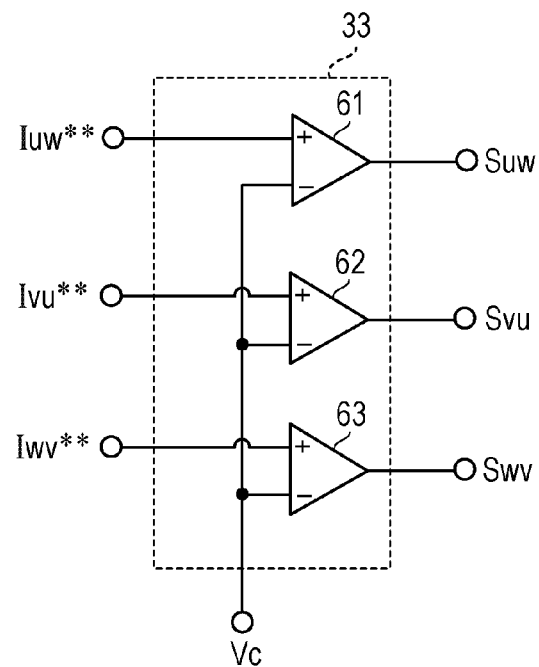
FIG. 11 is a diagram illustrating an example of the configuration of a comparator.

FIG. 11 is a diagram illustrating an example of the configuration of the comparator 33. As illustrated in FIG. 11, the comparator 33 includes comparators 61 to 63. The comparator 61 outputs the high level PWM pulse signal Suw when the corrected line to line current command Iuw is larger than or equal to the value of the carrier signal Vc, and outputs the low level PWM pulse signal Suw when the corrected line to line current command Iuw is less than the value of the carrier signal Vc.

Also, the comparator 62 outputs the high level PWM pulse signal Svu when the corrected line to line current command Ivu is larger than or equal to the value of the carrier signal Vc, and outputs the low level PWM pulse signal Svu when the corrected line to line current command Ivu is less than the value of the carrier signal Vc. Also, the comparator 63 outputs the high level PWM pulse signal Swv when the corrected line to line current command Iwv is larger than or equal to the value of the carrier signal Vc, and outputs the low level PWM pulse signal Swv when the corrected line to line current command Iwv is less than the value of the carrier signal Vc.

Referring back to FIG. 6, the configuration of the drive signal generator 23 will be continuously described. The polarity detector 34 detects the polarity of the phase current commands Iu*, Iv*, and Iw*, and generates phase current polarity signals Iud, Ivd, and Iwd in accordance with the polarity of the phase current commands Iu*, Iv*, and Iw*, respectively. The polarity detector 34 outputs the phase current polarity signals Iud, Ivd, and Iwd to the logic circuit 35.

Figure 12:
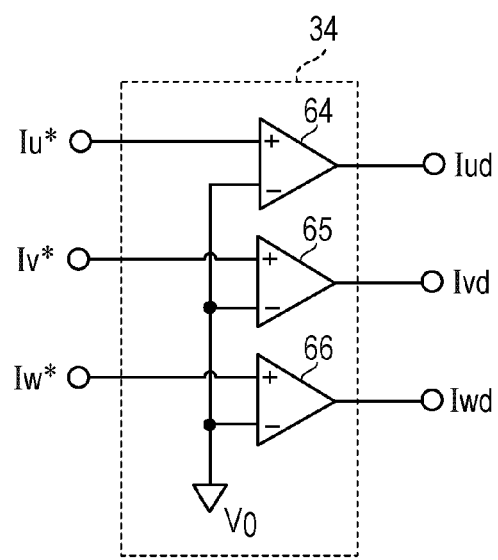
FIG. 12 is a diagram illustrating an example of the configuration of a polarity detector.

FIG. 12 is a diagram illustrating an example of the configuration of the polarity detector 34. As illustrated in FIG. 12, the polarity detector 34 includes three comparators 64 to 66. The comparators 64 to 66 respectively compare the phase current commands Iu*, Iv*, and Iw* with the zero voltage $V_0$.

The comparator 64 outputs the phase current polarity signal Iud in high level when the phase current command Iu* is larger than or equal to the zero voltage $V_0$, and outputs the phase current polarity signal Iud in low level when the phase current command Iu* is less than the zero voltage $V_0$. The comparator 65 outputs the phase current polarity signal Ivd in high level when the phase current command Iv* is larger than or equal to the zero voltage $V_0$, and outputs the phase current polarity signal Ivd in low level when the phase current command Iv* is less than the zero voltage $V_0$. The comparator 66 outputs the phase current polarity signal Iwd in high level when the phase current command Iw* is larger than or equal to the zero voltage $V_0$, and outputs the phase current polarity signal Iwd in low level when the phase current command Iw* is less than the zero voltage $V_0$.

Referring back to FIG. 6, the configuration of the drive signal generator 23 will be continuously described. The logic circuit 35 generates switch drive signals Sup*, Sun*, Svp*, Svn*, Swp*, and Swn* on the basis of the PWM pulse signals Suw, Svu, and Swv and the phase current polarity signals Iud, Ivd, and Iwd.

The switch drive signals Sup* and Sun* are signals for driving the U-phase switching elements 11a and 11b, respectively. Also, the switch drive signals Svp* and Svn* are signals for driving the V-phase switching elements 11c and 11d, respectively. Also, the switch drive signals Swp* and Swn* are signals for driving the W-phase switching elements 11e and 11f, respectively.

Figure 13:
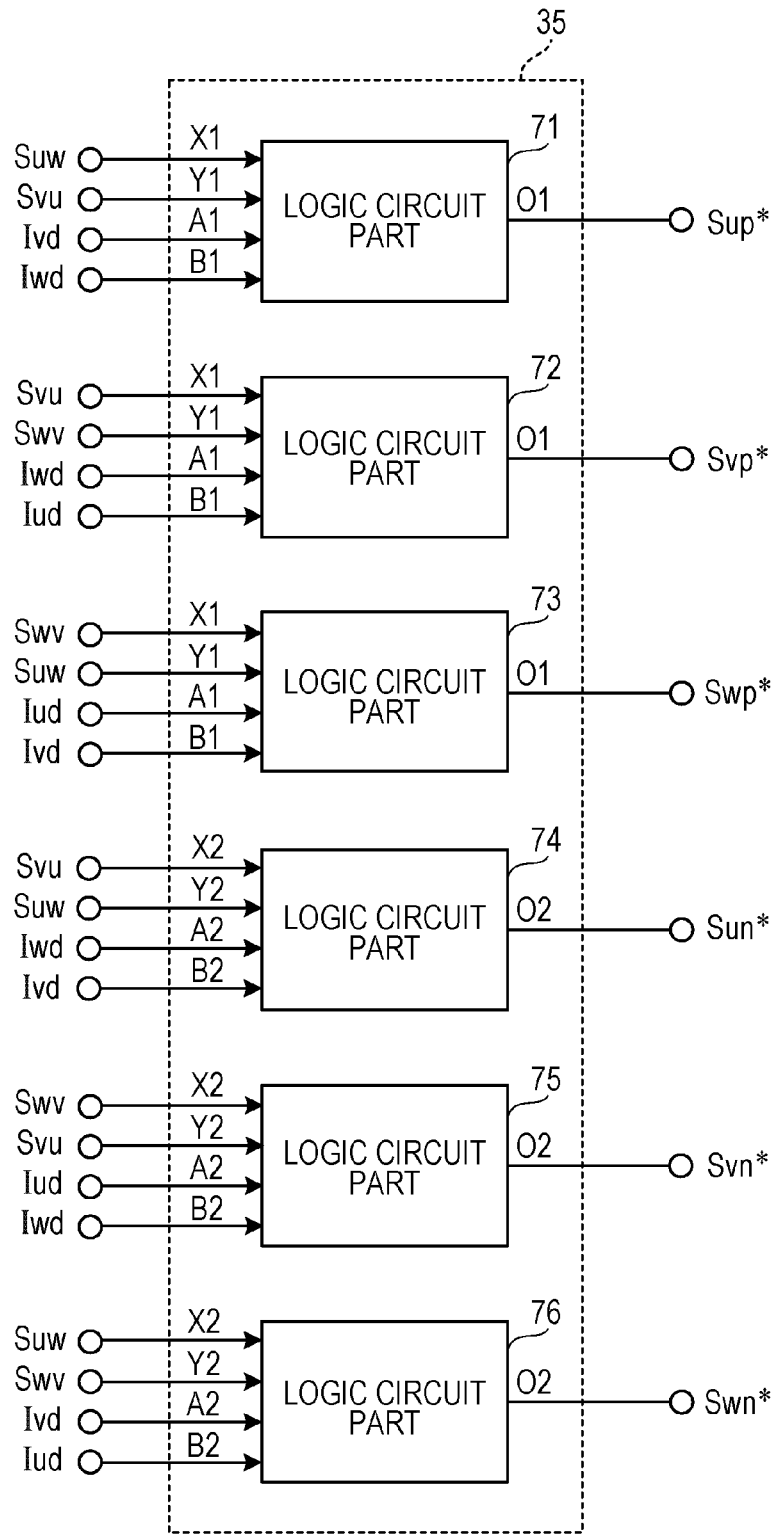
FIG. 13 is a diagram illustrating an example of the configuration of a logic circuit.

FIG. 13 is a diagram illustrating an example of the configuration of the logic circuit 35. As illustrated in FIG. 13, the logic circuit 35 includes logic circuit parts 71 to 76. The internal logic of the logic circuit parts 71 to 73 is represented by equation (7) below. Also, the internal logic of the logic circuit parts 74 to 76 is represented by equation (8) below. Note that the "bar" symbol in equations (7) and (8) below denotes inversion.

$$O1 = \overline{A1} \cdot B1 \cdot X1 + A1 \cdot \overline{B1} \cdot \overline{Y1} + \overline{A1} \cdot \overline{B1} \cdot X1 \cdot \overline{Y1} \quad (7)$$

$$O2 = A2 \cdot \overline{B2} \cdot X2 + \overline{A2} \cdot B2 \cdot \overline{Y2} + A2 \cdot B2 \cdot X2 \cdot \overline{Y2} \quad (8)$$

Figure 14:
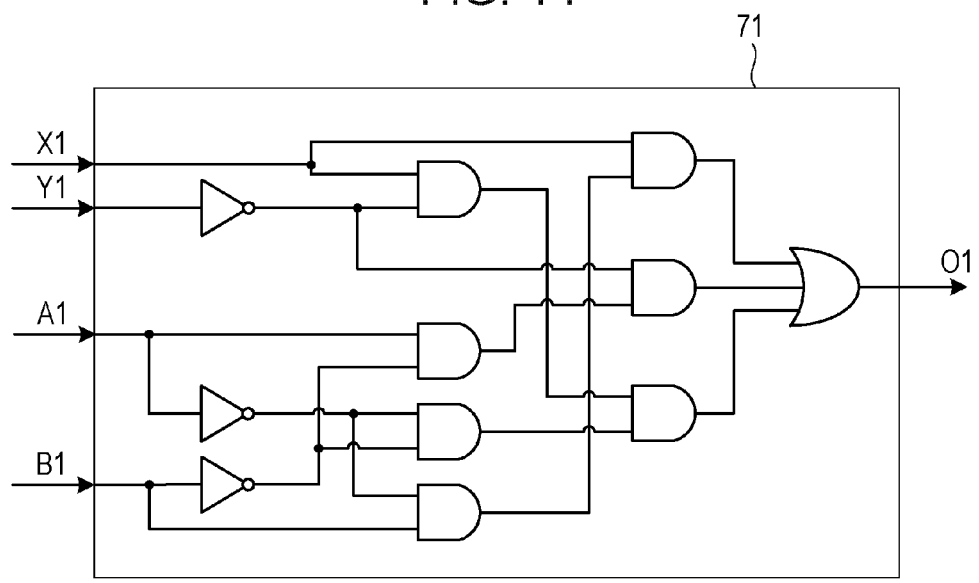
FIG. 14 is a diagram illustrating an example of the configuration of a logic circuit part.

The logic circuit part 71 can be configured with, for example, a circuit illustrated in FIG. 14. Also, the logic circuit parts 72 and 73 can be configured with the same or similar circuit as the logic circuit part 71. In the logic circuit part 71 illustrated in FIG. 14, the internal logic represented by equation (7) above is configured with NOT circuits, AND circuits, and an OR circuit.

Figure 15:
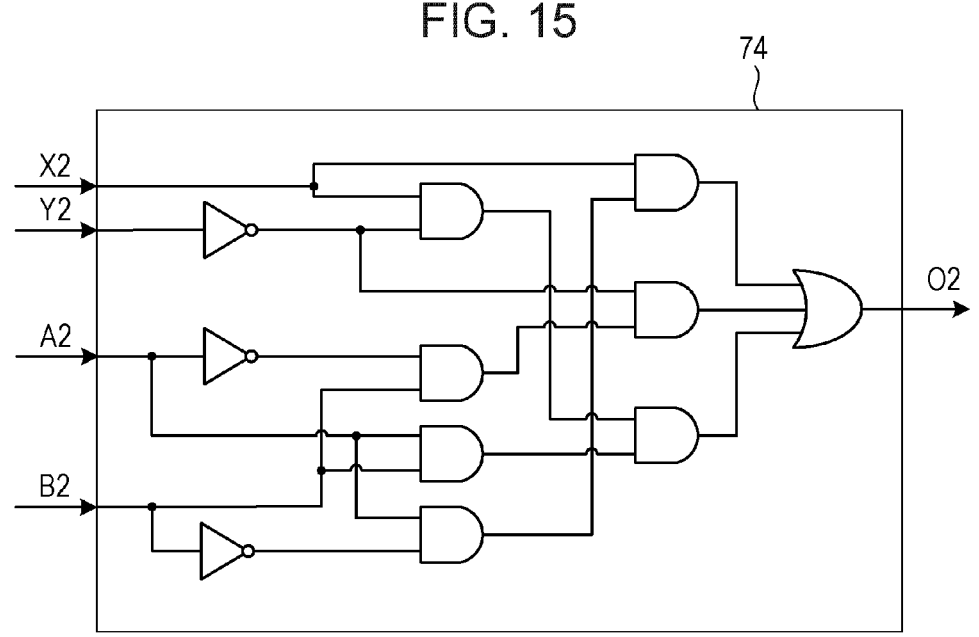
FIG. 15 is a diagram illustrating an example of the configuration of a logic circuit part.

The logic circuit part 74 can be configured with, for example, a circuit illustrated in FIG. 15. Also, the logic circuit parts 75 and 76 can be configured with the same or similar circuit as the logic circuit part 74. In the logic circuit part 74 illustrated in FIG. 15, the internal logic represented by equation (8) above is configured with NOT circuits, AND circuits, and an OR circuit.

Referring back to FIG. 6, the drive signal generator 23 will be continuously described. The off delay circuits 36a to 36f generate switch drive signals Sup, Sun, Svp, Svn, Swp, and Swn by delaying the falling edge of the switch drive signals Sup*, Sun*, Svp*, Svn*, Swp*, and Swn* input from the logic circuit 35. The off delay circuits 36a to 36f output the generated switch drive signals Sup, Sun, Svp, Svn, Swp, and Swn to the drive circuits 13a to 13f.

With these delayed switch drive signals Sup, Sun, Svp, Svn, Swp, and Swn, turning off of the switching elements 11 can be delayed. Thus, the open output state of the direct current source 2, due to the delayed turning on operation of the switching elements 11 or the like, can be suppressed.

Figure 16:
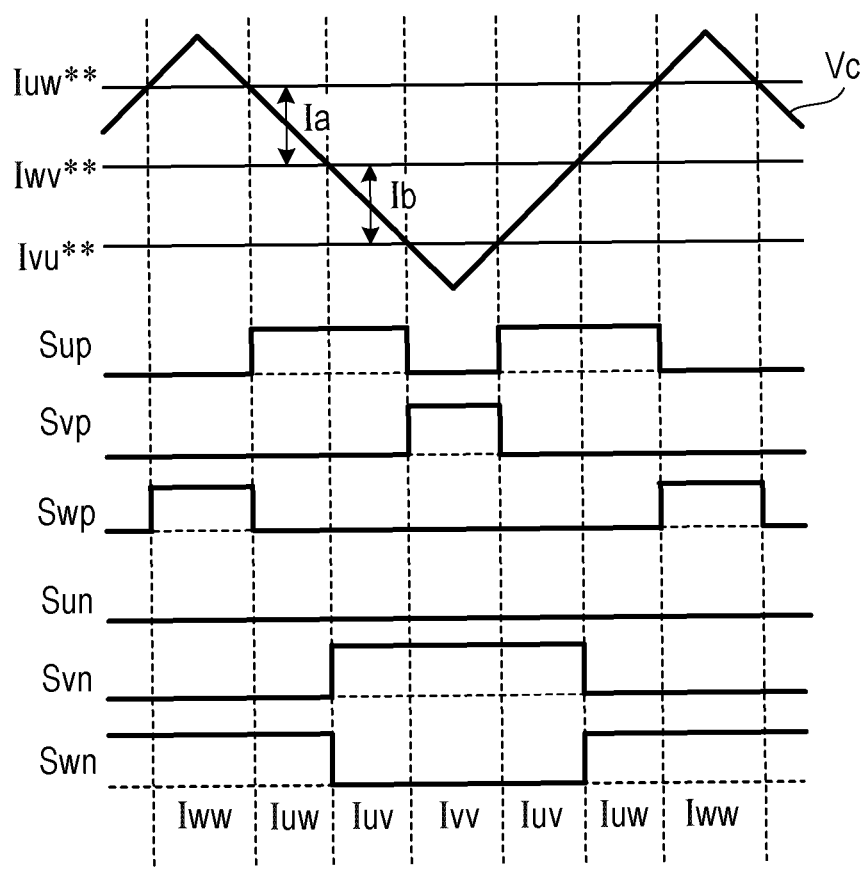
FIG. 16 is a chart illustrating the relationship among the line to line current commands, a carrier signal, and switch drive signals.
Figure 17:
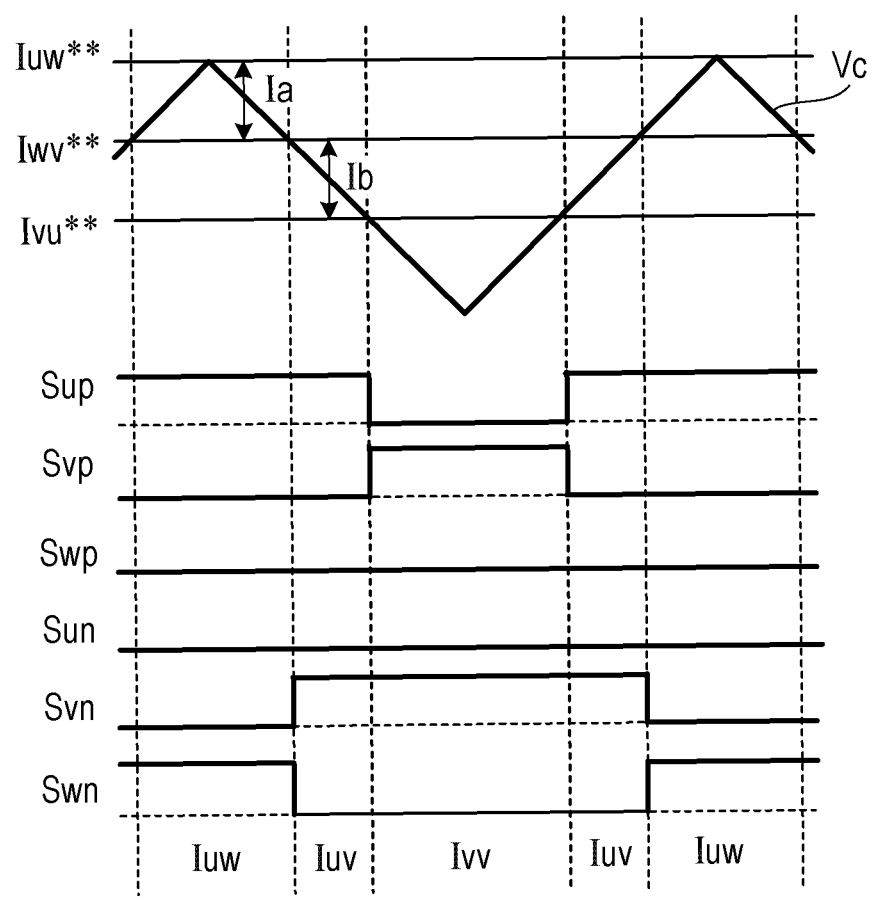
FIG. 17 is a chart illustrating the relationship among the line to line current commands, the carrier signal, and the switch drive signals.
Figure 18:
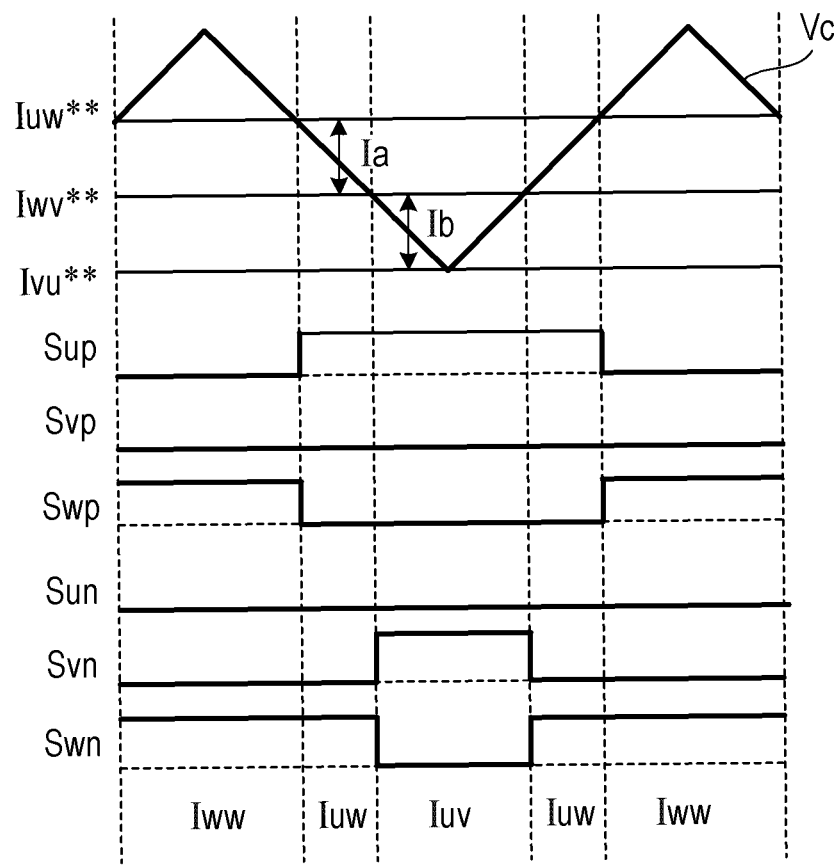
FIG. 18 is a chart illustrating the relationship among the line to line current commands, the carrier signal, and the switch drive signals.

The operation of the drive signal generator 23 with the above-described configuration will be described. FIGS. 16 to 18 are charts illustrating the relationship among the corrected line to line current commands Iuw, Ivu, and Iwv**, the carrier signal Vc, and the switch drive signals Sup, Sun, Svp, Svn, Swp, and Swn. The components Ia and Ib of the current command vector $I_{out\_r}$ at time t1 illustrated in FIG. 2 are respectively represented as the magnitudes of vectors Ia and Ib in FIGS. 16 to 18.

When the amplitude of the output voltage is less than the certain value, the current command corrector 31 directly outputs the line to line current commands Iuw*, Ivu*, and Iwv*, without correction. In this case, the output order of current vectors in one cycle of the carrier signal Vc is represented as follows in each of the regions A to F:

Iww→Iuw→Iuv→Ivv→Iuv→Iuw→Iww (region A)
Iuu→Iuw→Ivw→Ivv→Ivw→Iuw→Iuu (region B)
Iuu→Ivu→Ivw→Iww→Ivw→Ivu→Iuu (region C)
Ivv→Ivu→Iwu→Iww→Iwu→Ivu→Ivv (region D)
Ivv→Iwv→Iwu→Iuu→Iwu→Iwv→Ivv (region E)
Iww→Iwv→Iuv→Iuu→Iuv→Iwv→Iww (region F)

As shown above, in each of the regions A to F, two effective vectors and two zero vectors are output in one cycle of the carrier signal Vc. A PWM control system that uses two effective vectors and two zero vectors as shown above will be referred to as a four vector method hereinafter.

For example, in the region A, when the amplitude of the output voltage is less than the certain value, the switch drive signals Sup, Sun, Svp, Svn, Swp, and Swn become as illustrated in FIG. 16.

On the contrary, when the amplitude of the output voltage is larger than or equal to the certain value, the current command corrector 31 corrects the line to line current commands Iuw*, Ivu*, and Iwv*. In this case, in each of the regions A to F, two effective vectors and one zero vector are output in one cycle of the carrier signal Vc. The output order of current vectors in one cycle of the carrier signal Vc is represented as follows in each of the regions A to F:

Iww→Iuv→Iuv→Iuw→Iww (region A: Vw<Vv)
Iuw→Iuv→Ivv→Iuv→Iuw (region A: Vw≥Vv)
Iuu→Iuw→Ivw→Iuw→Iuu (region B: Vu<Vv)
Iuw→Ivw→Ivv→Ivw→Iuw (region B: Vu≥Vv)
Iuu→Ivu→Ivw→Ivu→Iuu (region C: Vu<Vw)
Ivu→Ivw→Iww→Ivw→Ivu (region C: Vu≥Vw)
Ivv→Ivu→Iwu→Ivu→Ivv (region D: Vv<Vw)
Ivu→Iwu→Iww→Iwu→Ivu (region D: Vv≥Vw)
Ivv→Iwv→Iwu→Iwv→Ivv (region E: Vv<Vu)
Iwv→Iwu→Iuu→Iwu→Iwv (region E: Vv≥Vu)
Iww→Iwv→Iuv→Iwv→Iww (region F: Vw<Vu)
Iwv→Iuv→Iuu→Iuv→Iwv (region F: Vw≥Vu)

For example, in the region A, it is assumed that the amplitude of the output voltage is larger than or equal to the certain value, and the detected phase voltage Vv corresponding to the zero vector Ivv is less than the detected phase voltage Vw corresponding to the zero vector Iww. In this case, as illustrated in FIG. 17, only the zero vector Ivv is output in one cycle of the carrier signal Vc. That is, the switch drive signals Svp and Svn are turned on, and the zero vector Ivv is output, whereas there is no period where the switch drive signals Swp and Swn are both turned on, and the zero vector Iww is not output.

Also, in the region A, it is assumed that the amplitude of the output voltage is larger than or equal to the certain value, and the detected phase voltage Vw corresponding to the zero vector Iww is less than the detected phase voltage Vv corresponding to the zero vector Ivv. In this case, as illustrated in FIG. 18, only the zero vector Iww is output in one cycle of the carrier signal Vc. That is, the switch drive signals Swp and Swn are turned on, and the zero vector Iww is output, whereas there is no period where the switch drive signals Svp and Svn are both turned on, and the zero vector Ivv is not output.

In this manner, the drive signal generator 23 is capable of outputting two zero vectors in one cycle of the carrier signal Vc in each of the regions A to F. On the basis of the detected phase voltages Vu, Vv, and Vw, the drive signal generator 23 corrects the line to line current commands Iuw*, Ivu*, and Iwv*, thereby outputting only the zero vector whose corresponding phase has the minimum absolute value of the phase voltage. Accordingly, the amplitude of the common mode voltage Vcom2 can be reduced, and fluctuations of the common mode voltage in transition from the short circuit mode to the output mode can be decreased.

As described above, when the amplitude of the output voltage is larger than or equal to the certain value, the current-source power converting apparatus 1 according to the first embodiment selects, out of the multiple zero vectors, a zero vector whose corresponding phase has the minimum absolute value of the phase voltage in the short circuit mode. The current-source power converting apparatus 1 generates switch drive signals on the basis of the selected zero vector. Therefore, the amplitude of the common mode voltage in the short circuit mode can be reduced, and fluctuations of the common mode voltage in transition from the short circuit mode to the output mode can be decreased.

In the above description, the amplitude of the common mode voltage in the short circuit mode is reduced by correcting the line to line current commands. However, it is only necessary to correct the relative relation between the line to line current commands and the carrier signal Vc, and this is not limited to correcting the line to line current commands. For example, the carrier signal Vc may be corrected with respect to the line to line current commands, thereby selecting a zero vector, out of the multiple zero vectors, whose corresponding phase has the minimum absolute value of the phase voltage.

Also, in the above description, switching is performed between the process of using two zero vectors defined for each region and the process of using one zero vector whose corresponding phase has the minimum absolute value of the phase voltage in accordance with whether the amplitude of the output voltage is larger than or equal to the certain value or not. Switching between the processes as described above is performed because the common mode voltage is smaller as the amplitude of the output voltage is smaller. However, the process of using one zero vector whose corresponding phase has the minimum absolute value of the phase voltage may be performed regardless of whether the amplitude of the output voltage is large or small.

Second Embodiment

Next, a current-source power converting apparatus according to a second embodiment will be described. In the current-source power converting apparatus 1 according to the first embodiment, switch drive signals are generated using the four vector method. On the contrary, in the current-source power converting apparatus according to the second embodiment, switch drive signals are generated using a later-described five vector method that uses two effective vectors and three zero vectors.

When the current command vector $I_{out\_r}$ (see FIG. 2) becomes small and the magnitudes of the vectors Ia and Ib approach substantially zero, the output time of each of the effective vectors may be shortened in the output mode in the current-source power converting apparatus 1 according to the first embodiment.

For example, in the period of the region A, when the magnitudes of the vectors Ia and Ib illustrated in FIG. 16 approach substantially zero, the period in which the current vector Iuw is output and the period in which the current vector Iuv is output are shortened. Thus, the width of the switch drive signal Sup approaches substantially zero, and the switch drive signal Sup becomes a short-width pulse.

The lower limit value of a duration where the switching elements 11 can output signals is determined depending on the turning on time and turning off time of the switching elements 11 and the transfer time of the switch drive signals. Therefore, when the switch drive signals are short-width pulses, the switching elements 11 may not be turned on. To this end, in the current-source power converting apparatus according to the second embodiment, the five vector method using two effective vectors and three zero vectors is adopted.

Figure 19:
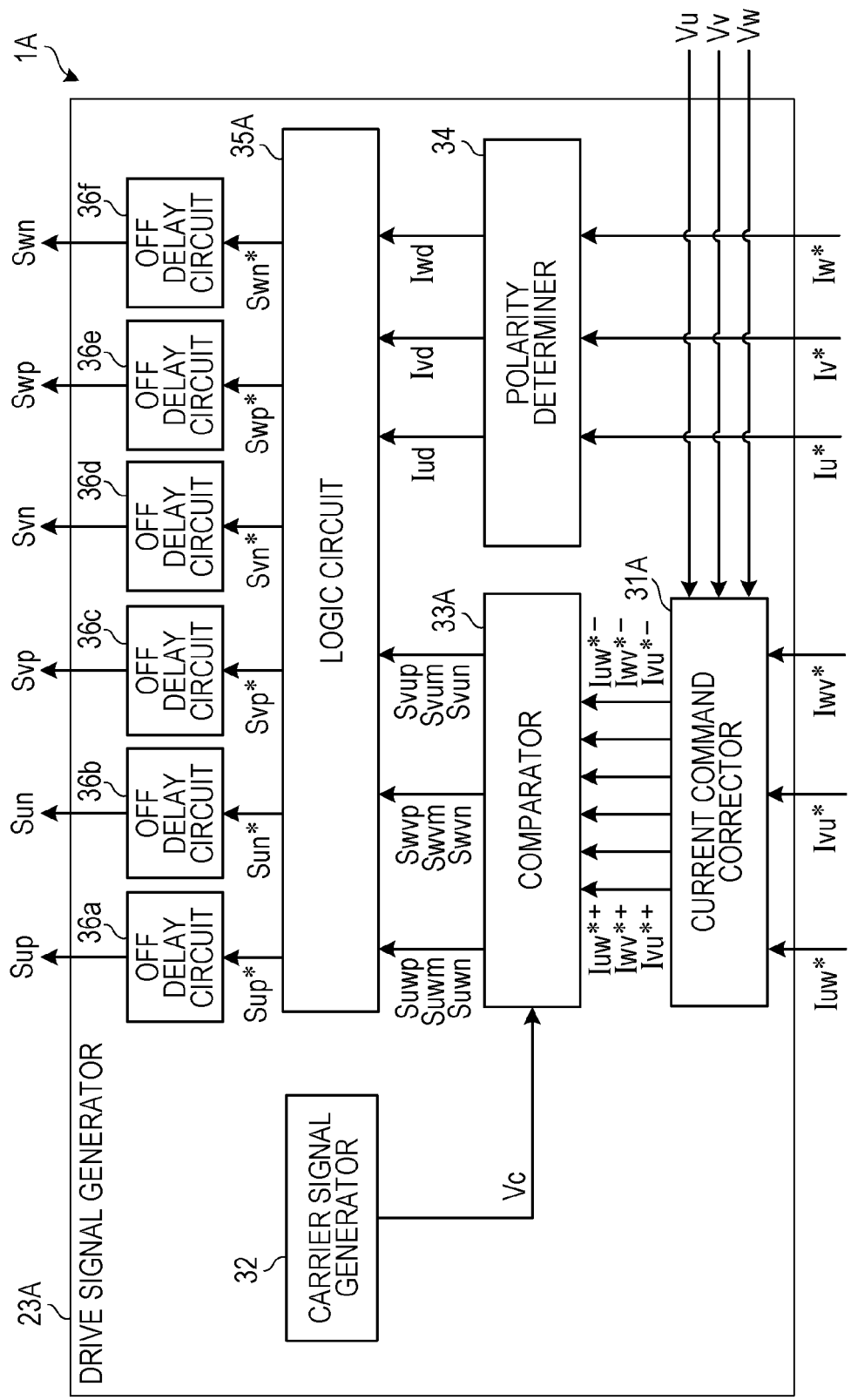
FIG. 19 is a diagram illustrating the configuration of a current-source power converting apparatus according to a second embodiment.

FIG. 19 is a diagram illustrating the configuration of a current-source power converting apparatus 1A according to the second embodiment. The current-source power converting apparatus 1A according to the second embodiment is different, in the configuration of a drive signal generator, from the current-source power converting apparatus 1 according to the first embodiment. Hereinafter, a drive signal generator 23A of the current-source power converting apparatus 1A according to the second embodiment will be described. Note that elements corresponding to the elements of the above-described first embodiment are given the same reference numerals, and descriptions that overlap with those in the first embodiment are appropriately omitted.

As illustrated in FIG. 19, the drive signal generator 23A includes a current command corrector 31A, the carrier signal generator 32, a comparator 33A, the polarity detector 34, a logic circuit 35A, and the off delay circuits 36a to 36f.

The current command corrector 31A corrects the line to line current commands Iuw*, Ivu*, and Iwv* on the basis of the detected phase voltages Vu, Vv, and Vw, and generates the corrected line to line current commands $Iuw^{*+}$, $Iuw^{*-}$, $Ivu^{*+}$, $Ivu^{*-}$, $Iwv^{*+}$, and $Iwv^{*-}$.

Figure 20:
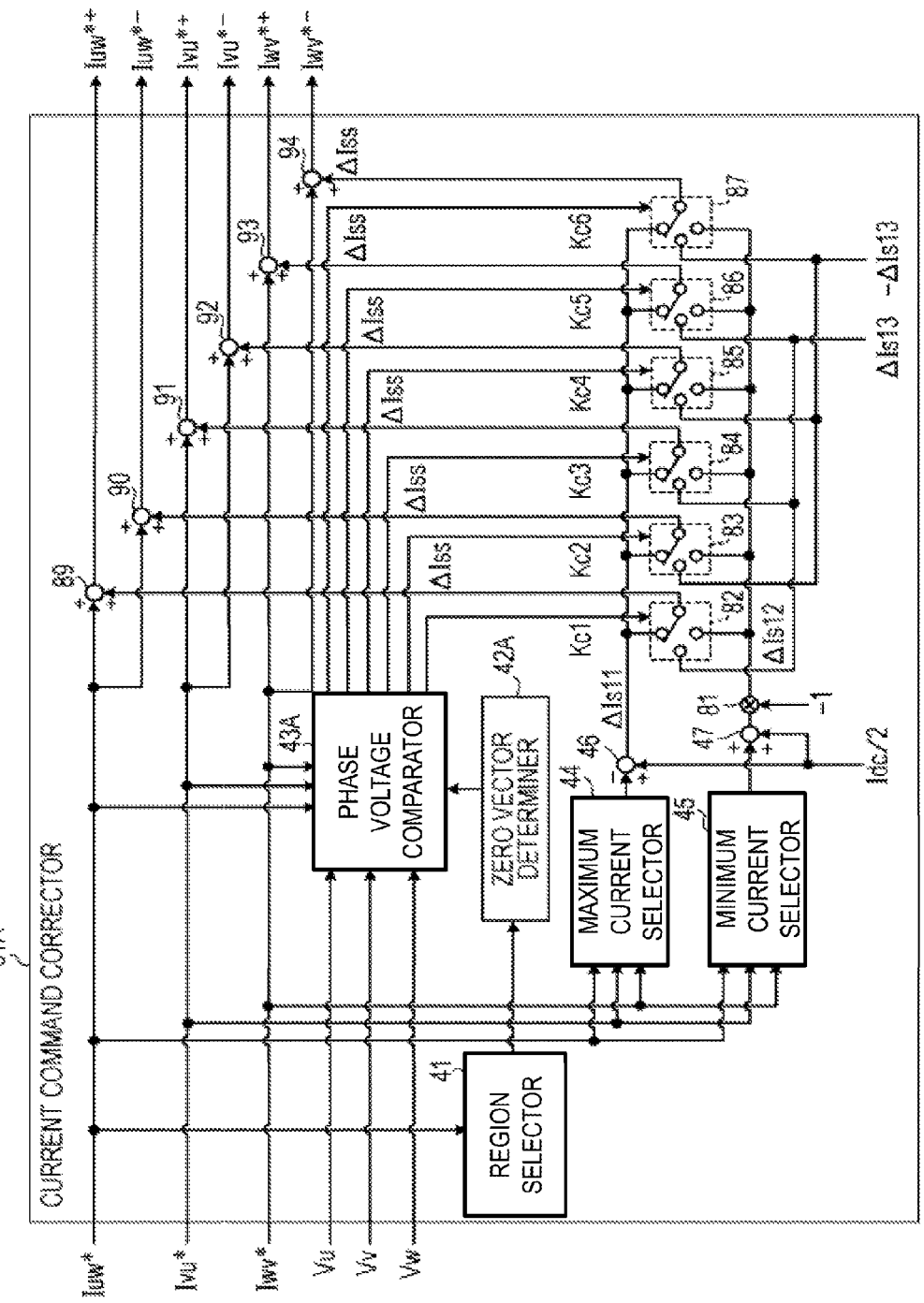
FIG. 20 is a diagram illustrating an example of the configuration of a current command corrector.

FIG. 20 is a diagram illustrating an example of the configuration of the current command corrector 31A. As illustrated in FIG. 20, the current command corrector 31A includes the region selector 41, a zero vector determiner 42A, a phase voltage comparator 43A, the maximum current selector 44, the minimum current selector 45, the subtractor 46, the adders 47 and 89 to 94, a multiplier 81, and switches 82 to 87.

The region selector 41 selects, among the regions A to F, a region corresponding to the phase state of the line to line current commands Iuw*, Ivu*, and Iwv*.

The zero vector determiner 42A determines, on the basis of a zero vector table set therein, three zero vectors corresponding to the region selected by the region selector 41, and reports the selection result to the phase voltage comparator 43A. The zero vector determiner 42A determines a first zero vector, a second zero vector, and a third zero vector as the three zero vectors.

Figures 21, 22:
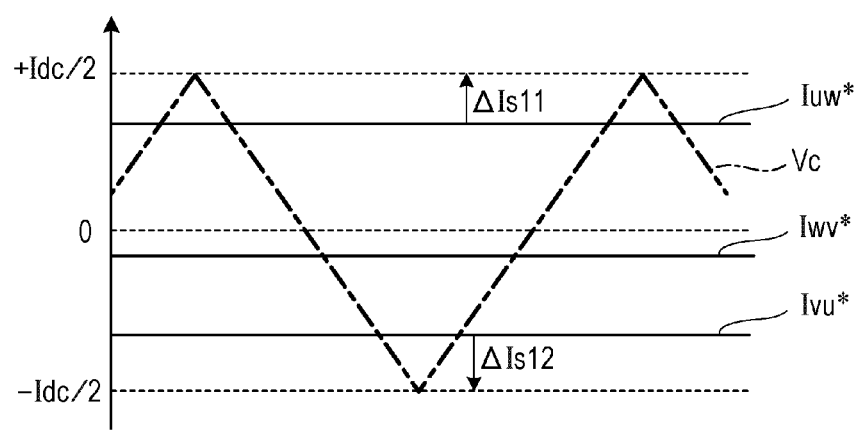
FIG. 21 is a diagram illustrating an example of a determination table.
FIG. 22 is a chart for describing the relationship between the line to line current commands and offsets.

FIG. 21 is a diagram illustrating an example of the zero vector table. For example, in the case of the region A, the zero vector determiner 42A determines, on the basis of the zero vector table, that the first zero vector is the current vector Ivv, the second zero vector is the current vector Iww, and the third zero vector is the current vector Iuu. Although the example that the zero vectors are determined using the zero vector table has been described here, the zero vectors may be determined using, for example, a logic circuit or the like.

The phase voltage comparator 43A outputs comparison results Kc1 to Kc6 based on the detected phase voltage Vu, Vv, and Vw to the switches 82 to 87. When the amplitude of the phase voltage is less than the certain value, the phase voltage comparator 43A outputs the comparison results Kc1 to Kc6 of "0". Note that the amplitude of the phase voltage may be detected on the basis of any one of the detected phase voltages Vu, Vv, and Vw.

On the contrary, when the amplitude of the phase voltage is larger than or equal to the certain value, the phase voltage comparator 43A compares the detected phase voltages corresponding to the first zero vector, the second zero vector, and the third zero vector. When the detected phase voltage corresponding to the first zero vector is the smallest, the phase voltage comparator 43A outputs the comparison results Kc1 to Kc6 of "+1". When the detected phase voltage corresponding to the second zero vector is the smallest, the phase voltage comparator 43A outputs the comparison results Kc1 to Kc6 of "−1".

Also, when the detected phase voltage corresponding to the third zero vector is the smallest, the phase voltage comparator 43A compares the line to line current commands Iuw*, Ivu*, and Iwv*. Hereinafter, the line to line current command whose value is intermediate among the line to line current commands Iuw*, Ivu*, and Iwv* is described as the intermediate line to line current command. When the maximum line to line current command is expressed as Imax, the minimum line to line current command is expressed as Imin, and the intermediate line to line current command is expressed as Imid. Imax=Iuv*, Imid=Iwv*, and Imin=Ivu*, for example, in the region A.

The phase voltage comparator 43A outputs "+1" to the switches corresponding to the maximum line to line current command Imax, outputs "−1" to the switches corresponding to the minimum line to line current command Imin, and outputs "+1" and "−1" to the switches corresponding to the intermediate line to line current command Imid. For example, Imax=Iuw*, Imid=Iwv*, and Imin=Ivu* in the region A. In this case, the phase voltage comparator 43A outputs the comparison results Kc1 and Kc2 of "+1" for the switches 82 and 83 outputting signals to the adders 89 and 90 to which the line to line current command Iuw* is input. Also, the phase voltage comparator 43A outputs the comparison results Kc3 and Kc4 of "−1" for the switches 84 and 85 outputting signals to the adders 91 and 92 to which the line to line current command Ivu* is input. Further, for the adders 93 and 94 to which the line to line current command Iwv* is input, the phase voltage comparator 43A outputs the comparison result Kc5 of "+1" for the switch 86 outputting a signal to the adder 93, and outputs the comparison result Kc6 of "−1" for the switch 87 outputting a signal to the adder 94.

The maximum current selector 44 selects and outputs the maximum line to line current command out of the line to line current commands Iuw*, Ivu*, and Iwv* input from the current command generator 22. The subtractor 46 subtracts the maximum line to line current command, output from the maximum current selector 44, from the current value Idc/2 and generates a first offset ΔIs11. The subtractor 46 outputs the first offset ΔIs11 to the switches 82 to 87.

The minimum current selector 45 selects and outputs the minimum line to line current command out of the line to line current commands Iuw*, Ivu*, and Iwv* input from the current command generator 22. The adder 47 adds the current value Idc/2 to the minimum line to line current command output from the minimum current selector 45. The multiplier 81 generates a second offset ΔIs12 by multiplying the addition result obtained by the adder 47 by "−1", and outputs the second offset ΔIs12 to the switches 82 to 87.

In addition to the first offset ΔIs11 and the second offset ΔIs12, a third offset ±ΔIs13 is further input to the switches 82 to 87. Specifically, the third offset +ΔIs13 is input to the switches 82, 84, and 86, and the third offset −ΔIs13 is input to the switches 83, 85, and 87. The third offset +ΔIs13 and −ΔIs13 are predefined value. As will be described later, in the current-source power converting apparatus 1A according to the second embodiment, one of the first offset ΔIs11, the second offset ΔIs12, and the third offset ±ΔIs13 is selectively used, thereby switching the zero vectors to use.

FIG. 22 is a chart for describing the relationship among the line to line current commands Iuw*, Ivu*, and Iwv*, the first offset ΔIs11, and the second offset ΔIs12. When the line to line current commands Iuw*, Ivu*, and Iwv* are in a state illustrated in FIG. 22, the maximum line to line current command is the line to line current command Iuw*. The first offset ΔIs11 is a value obtained by subtracting the line to line current command Iuw* from the current value Idc/2. Also, the minimum line to line current command is the line to line current command Ivu*. The second offset value ΔIs12 is a value obtained by inverting the polarity of the sum obtained by adding the current value Idc/2 to the line to line current command Ivu*.

On the basis of the comparison results Kc1 to Kc6 input from the phase voltage comparator 43A, the switches 82 to 87 output one of the first offset ΔIs11, the second offset ΔIs12, and the third offset ±ΔIs13 as an offset ΔIss to the adders 89 to 94.

Specifically, the switches 82, 84, and 86 output the third offset ΔIs13 as the offset ΔIss respectively to the adders 89, 91, and 93 when the comparison results Kc1, Kc3, and Kc5 are "0". Also, the switches 83, 85, and 87 output the third offset −ΔIs13 as the offset ΔIss respectively to the adders 90, 92, and 94 when the comparison results Kc2, Kc4, and Kc6 are "0".

Also, the switches 82 to 87 output the first offset ΔIs11 as the offset ΔIss to the adders 89 to 94, respectively, when the comparison results Kc1 to Kc6 are "+1". Also, the switches 82 to 87 output the second offset ΔIs12 as the offset ΔIss to the adders 89 to 94, respectively, when the comparison results Kc1 to Kc6 are "−1".

The adders 89 to 94 add the offsets ΔIss, output from the switches 82 to 87, to the line to line current commands Iuw*, Ivu*, and Iwv*. The adders 89 to 94 output the addition results to the comparator 33A respectively as corrected line to line current commands $Iuw^{*+}$, $Iuw^{*-}$, $Ivu^{*+}$, $Ivu^{*-}$, $Iwv^{*+}$, and $Iwv^{*-}$. Specifically, the adders 89 and 90 add the offsets ΔIss output from the switches 82 and 83, respectively, to the line to line current command Iuw*, and output the addition results as the corrected line to line current commands $Iuw^{*+}$ and $Iuw^{*-}$ to the comparator 33A.

Also, the adders 91 and 92 respectively add the offsets ΔIss output from the switches 84 and 85 to the line to line current command Ivu*, and output the addition results as the corrected line to line current commands $Ivu^{*+}$ and $Ivu^{*-}$ to the comparator 33A. Also, the adders 93 and 94 respectively add the offsets ΔIss output from the switches 86 and 87 to the line to line current command Iwv*, and output the added results as the corrected line to line current commands $Iwv^{*+}$ and $Iwv^{*-}$ to the comparator 33A.

In this manner, on the basis of the detected phase voltages Vu, Vv, and Vw, the current command corrector 31A corrects the line to line current commands Iuw*, Ivu*, and Iwv* and generates the corrected line to line current commands $Iuw^{*+}$, $Iuw^{*-}$, $Ivu^{*+}$, $Ivu^{*-}$, $Iwv^{*+}$, and $Iwv^{*-}$. The current command corrector 31A outputs the generated corrected line to line current commands $Iuw^{*+}$, $Iuw^{*-}$, $Ivu^{*+}$, $Ivu^{*-}$, $Iwv^{*+}$, and $Iwv^{*-}$ to the comparator 33A.

Referring back to FIG. 19, the configuration of the drive signal generator 23A will be continuously described. The carrier signal generator 32 generates the carrier signal Vc and outputs the carrier signal Vc to the comparator 33A. The comparator 33A compares the corrected line to line current commands Iuw*+, Iuw*−, Ivu*+, Ivu*−, Iwv*+, and Iwv*− with the carrier signal Vc, and generates PWM pulse signals Suwp, Suwm, Suwn, Svup, Svum, Svun, Swvp, Swvm, and Swvn.

Figure 23:
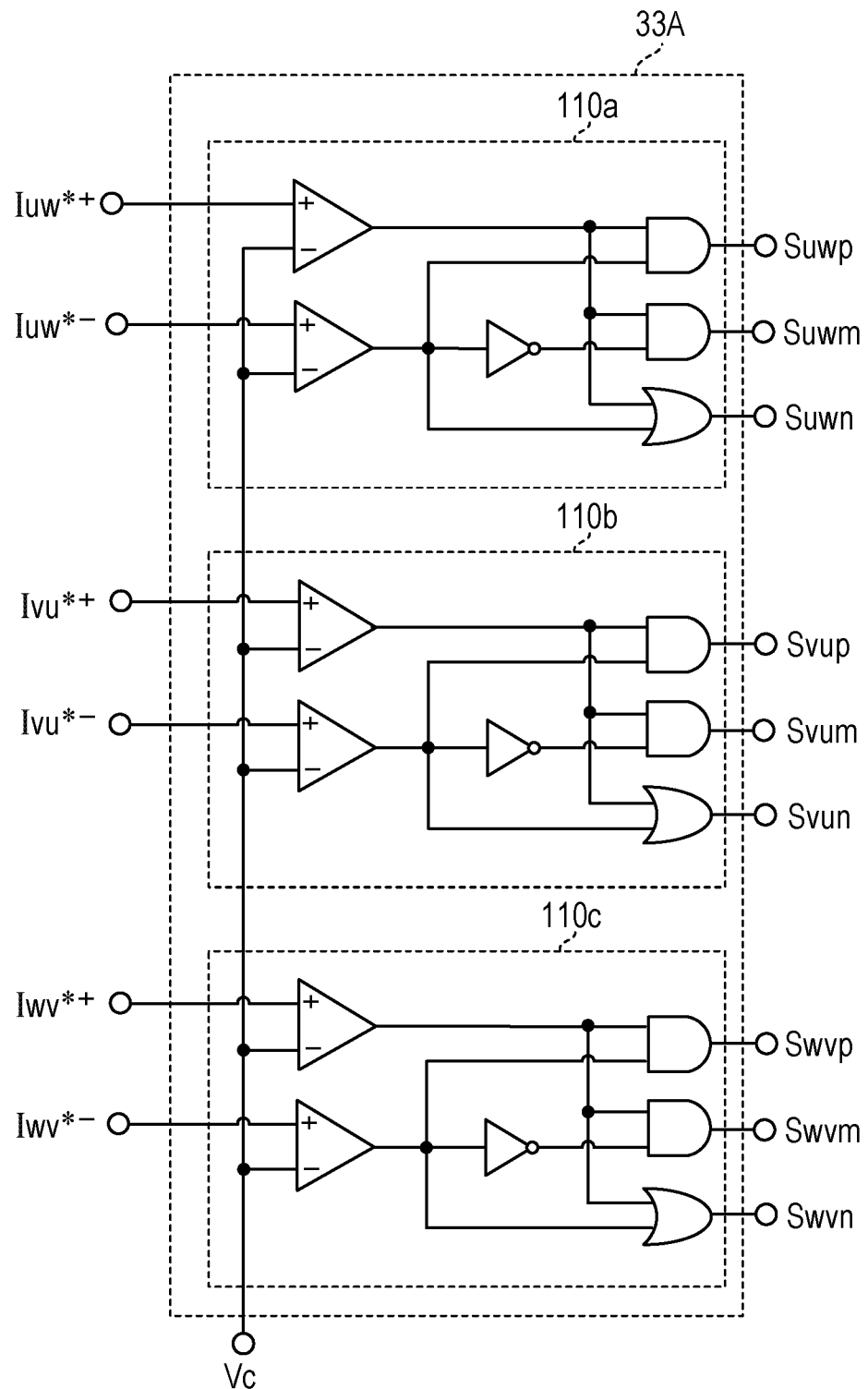
FIG. 23 is a diagram illustrating an example of the configuration of a comparator.

FIG. 23 is a diagram illustrating an example of the configuration of the comparator 33A. As illustrated in FIG. 23, the comparator 33A includes a first comparator 110a, a second comparator 110b, and a third comparator 110c. The first comparator 110a generates the PWM pulse signals Suwp, Suwm, and Suwn on the basis of the state of the corrected line to line current commands Iuw*+ and Iuw*−.

Specifically, when the corrected line to line current commands Iuw*+ and Iuw*− are both larger than or equal to the value of the carrier signal Vc, the first comparator 110a generates the PWM pulse signal Suwp in high level. Otherwise, the first comparator 110a generates the PWM pulse signal Suwp in low level. Also, when the corrected line to line current command Iuw*+ is larger than or equal to the value of the carrier signal Vc and the corrected line to line current command Iuw*− is less than the value of the carrier signal Vc, the first comparator 110a generates the PWM pulse signal Suwm in high level. Otherwise, the first comparator 110a generates the PWM pulse signal Suwm in low level. Also, when the corrected line to line current commands Iuw*+ or Iuw*− is larger than or equal to the value of the carrier signal Vc, the first comparator 110a generates the PWM pulse signal Suwn in high level. Otherwise, the first comparator 110a generates the PWM pulse signal Suwn in low level.

As illustrated in FIG. 23, the second comparator 110b and the third comparator 110c also have the same configuration as the first comparator 110a. On the basis of the state of the corrected line to line current commands Ivu*+ and Ivu*−, the second comparator 110b generates the PWM pulse signals Svup, Svum, and Svun. Also, on the basis of the state of the corrected line to line current commands Iwv*+ and Iwv*−, the third comparator 110c generates the PWM pulse signals Swvp, Swvm, and Swvn.

Referring back to FIG. 19, the configuration of the drive signal generator 23A will be continuously described. The polarity detector 34 detects the polarity of the phase current commands Iu*, Iv*, and Iw*, and generates phase current polarity signals Iud, Ivd, and Iwd in accordance with the polarity of the phase current commands Iu*, Iv*, and Iw*, respectively. The polarity detector 34 can be configured as illustrated in FIG. 12, as in the first embodiment.

On the basis of the PWM pulse signals Suwp, Suwm, Suwn, Svup, Svum, Svun, Swvp, Swvm, and Swvn input from the comparator 33A and the phase current polarity signals Iud, Ivd, and Iwd input from the polarity detector 34, the logic circuit 35A generates switch drive signals Sup*, Sun*, Svp*, Svn*, Swp*, and Swn*.

Figure 24:
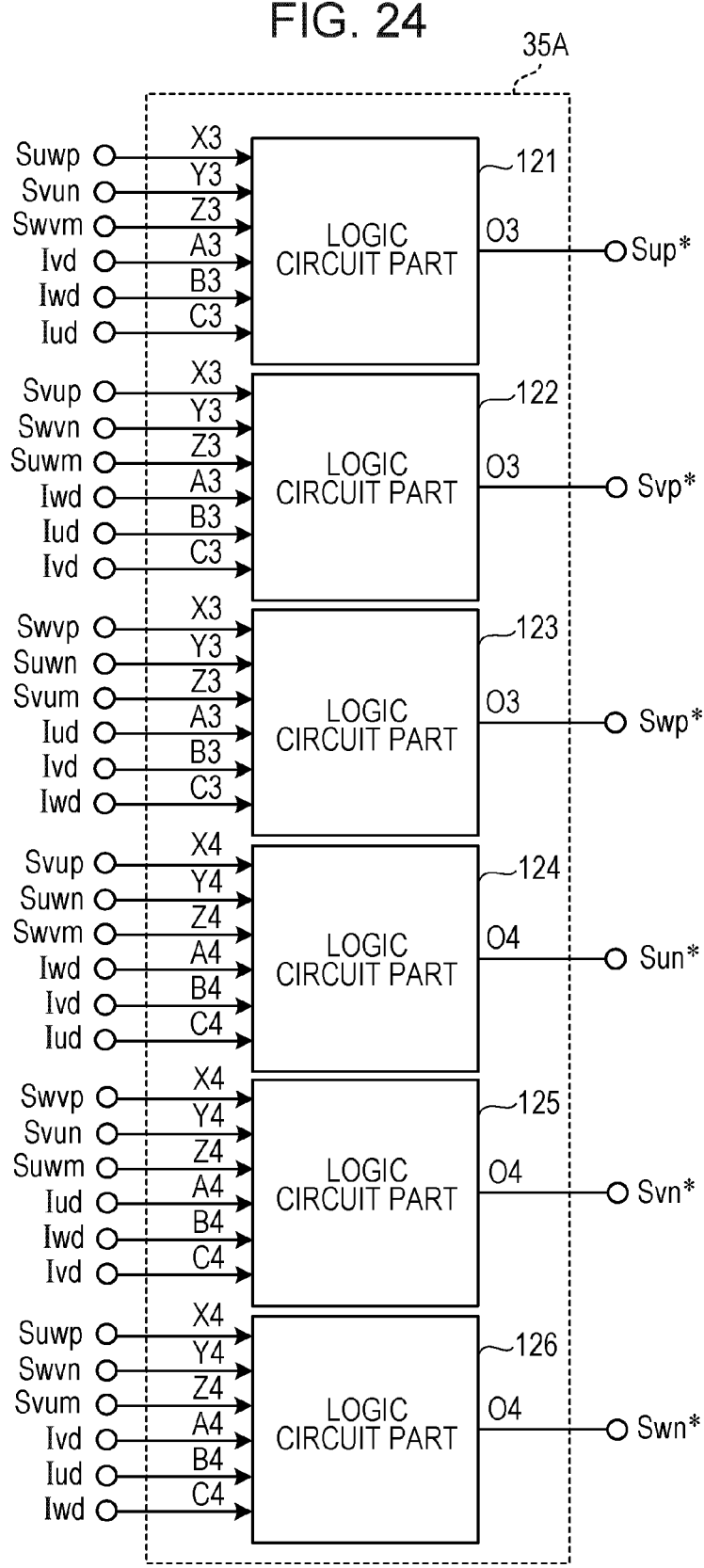
FIG. 24 is a diagram illustrating an example of the configuration of a logic circuit.

FIG. 24 is a diagram illustrating an example of the configuration of the logic circuit 35A. As illustrated in FIG. 24, the logic circuit 35A includes logic circuit parts 121 to 126. The internal logic of the logic circuit parts 121 to 123 is represented by equation (9) below. Also, the internal logic of the logic circuit parts 124 to 126 is represented by equation (10) below. Note that the "bar" symbol in equations (9) and (10) below denotes inversion.

$$O3 = \overline{A3} \cdot B3 \cdot X3 + A3 \cdot \overline{B3} \cdot \overline{Y3} + \overline{A3} \cdot \overline{B3} \cdot X3 \cdot \overline{Y3} + A3 \cdot B3 \cdot \overline{C3} \cdot Z3 \quad (9)$$

$$O4 = A4 \cdot \overline{B4} \cdot X4 + \overline{A4} \cdot B4 \cdot Y4 + A4 \cdot B4 \cdot X4 \cdot Y4 + \overline{A4} \cdot \overline{B4} \cdot C4 \cdot Z4 \quad (10)$$

Figure 25:
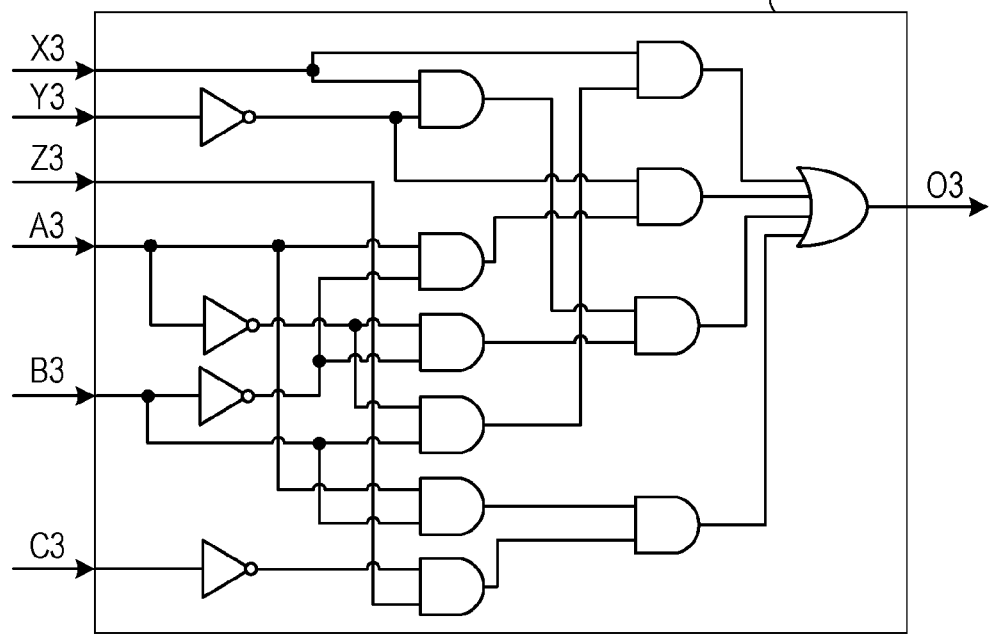
FIG. 25 is a diagram illustrating an example of the configuration of a logic circuit part.

The logic circuit part 121 can be configured with, for example, a circuit illustrated in FIG. 25. Also, the logic circuit parts 122 and 123 can be configured with the same or similar circuit as the logic circuit part 121. In the logic circuit part 121 illustrated in FIG. 25, the internal logic represented by equation (9) above is configured with NOT circuits, AND circuits, and an OR circuit.

Figure 26:
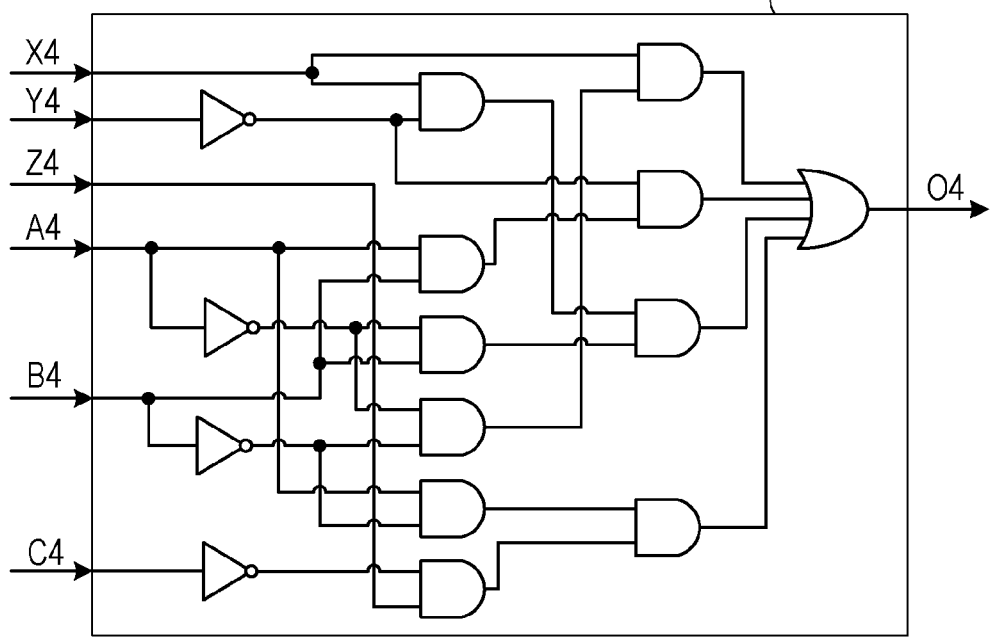
FIG. 26 is a diagram illustrating an example of the configuration of a logic circuit part.

The logic circuit part 124 can be configured with, for example, a circuit illustrated in FIG. 26. Also, the logic circuit parts 125 and 126 can be configured with the same or similar circuit as the logic circuit part 124. In the logic circuit part 124 illustrated in FIG. 26, the internal logic represented by equation (10) above is configured with NOT circuits, AND circuits, and an OR circuit.

Referring back to FIG. 19, the configuration of the drive signal generator 23A will be continuously described. The off delay circuits 36a to 36f generate switch drive signals Sup, Sun, Svp, Svn, Swp, and Swn by delaying the falling edge of the switch drive signals Sup*, Sun*, Svp*, Svn*, Swp*, and Swn* input from the logic circuit 35A. The off delay circuits 36a to 36f output the generated switch drive signals Sup, Sun, Svp, Svn, Swp, and Swn to the drive circuits 13a to 13f.

The operation of the drive signal generator 23A with the above-described configuration will be described. When the amplitude of the output voltage is less than the certain value, the output order of current vectors in one cycle of the carrier signal Vc is represented as follows in each of the regions A to F:

Iww→Iuw→Iuu→Iuv→Ivv→Iuv→Iuu→Iuw→Iww (region A)

Iuu→Iuw→Iww→Ivw→Ivv→Ivw→Iww→Iuw→Iuu (region B)

Iuu→Ivu→Ivv→Ivw→Iww→Ivw→Ivv→Ivu→Iuu (region C)

Ivv→Ivu→Iuu→Iwu→Iww→Iwu→Iuu→Ivu→Ivv (region D)

Ivv→Iwv→Iww→Iwu→Iuu→Iwu→Iww→Iwv→Ivv (region E)

Iww→Iwv→Ivv→Iuv→Iuu→Iuv→Ivv→Iwv→Iww (region F)

In each of the regions A to F as above, two effective vectors and three zero vectors are output in one cycle of the carrier signal Vc.

Figure 27:
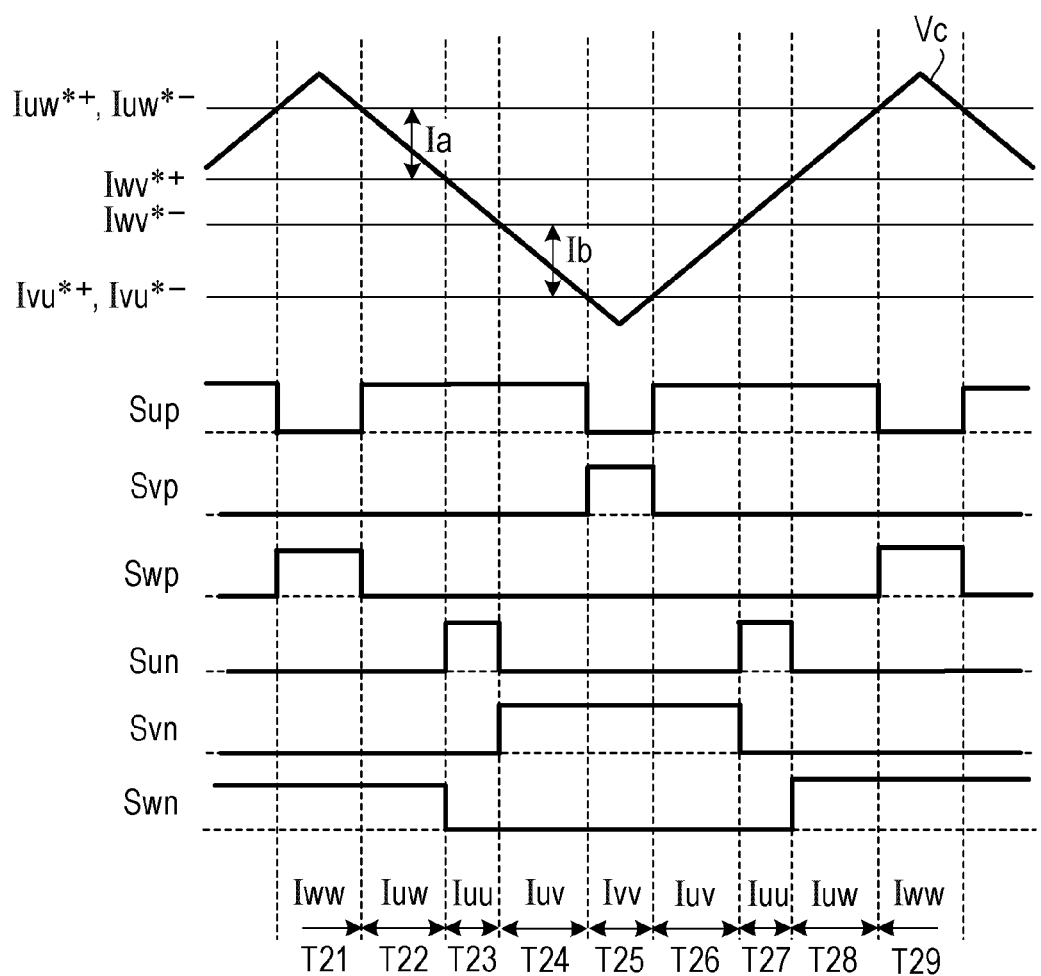
FIG. 27 is a chart illustrating the relationship among the line to line current commands, the carrier signal, and the switch drive signals.

FIG. 27 is a chart illustrating the relationship among the corrected line to line current commands Iuw*+, Iuw*−, Ivu*+, Ivu*−, Iwv*+, and Iwv*−, the carrier signal Vc, and the switch drive signals Sup, Sun, Svp, Svn, Swp, and Swn. The components Ia and Ib of the current command vector $I_{out\_r}$ at time t1 illustrated in FIG. 2 are represented as the magnitudes of vectors Ia and Ib, respectively, in FIG. 27.

As illustrated in FIG. 27, a zero vector is output in period T23 and period T27. Therefore, even when the current command vector $I_{out\_r}$ becomes small, the width of the switch drive signal Sup in period T22 to period T24 (period T26 to period T28) is increased because of the additional time in which the zero vector is output. That is, the occurrence of short-width pulses is suppressed. The time in which the zero vector Iuu is output may be a preset time based on the above-described lower limit value with a certain margin. The third offset ΔIs13 is set so as to generate that time.

On the contrary, when the amplitude of the output voltage is larger than or equal to the certain value, the current command corrector 31A outputs one of the zero vectors, corresponding to the phase with the minimum voltage. Specifically, when the amplitude of the output voltage is larger than or equal to the certain value and when the voltage of the phase corresponding to the first zero vector is the minimum, the output order of current vectors in one cycle of the carrier signal Vc is the same order as that in the case of the four vector method described using FIG. 17.

Figure 28:
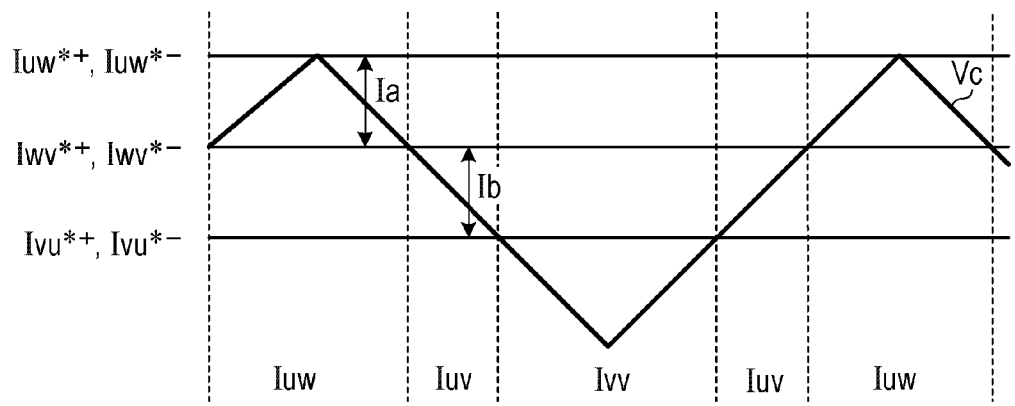
FIG. 28 is a chart illustrating the relationship between the carrier signal and the line to line current commands.

For example, in the region A, when the detected phase voltage Vv is the minimum, the relationship between the carrier signal Vc and the corrected line to line current commands $Iuw^{*+}$, $Iuw^{*-}$, $Ivu^{*+}$, $Ivu^{*-}$, $Iwv^{*+}$, and $Iwv^{*-}$ becomes such as that illustrated in FIG. 28. The line to line current commands $Iuw^{*+}$ and $Iuw^{*-}$ are the same; the line to line current commands $Ivu^{*+}$ and $Ivu^{*-}$ are the same; and the line to line current commands $Iwv^{*+}$ and $Iwv^{*-}$ are the same. In this case, only the zero vector Ivv whose corresponding detected phase voltage is less than that of the zero vector Iww is output in one cycle of the carrier signal Vc.

In this manner, when the output phase whose phase voltage has the minimum absolute value is the phase corresponding to the first zero vector, the current command corrector 31A generates the corrected line to line current commands $Iuw^{*+}$, $Iuw^{*-}$, $Ivu^{*+}$, $Ivu^{*-}$, $Iwv^{*+}$, and $Iwv^{*-}$ by increasing the line to line current commands Iuw*, Ivu*, and Iwv* until the line to line current command whose value is the maximum among the line to line current commands Iuw*, Ivu*, and Iwv* becomes equal to the peak value of the carrier signal Vc. Note that the phase corresponding to the first zero vector is an example of a first output phase.

Also, when the amplitude of the output voltage is larger than or equal to the certain value and when the voltage of the phase corresponding to the second zero vector is the minimum, the order of current vectors output in one cycle of the carrier signal Vc is the same order as that in the case of the four vector method described using FIG. 18.

Figure 29:
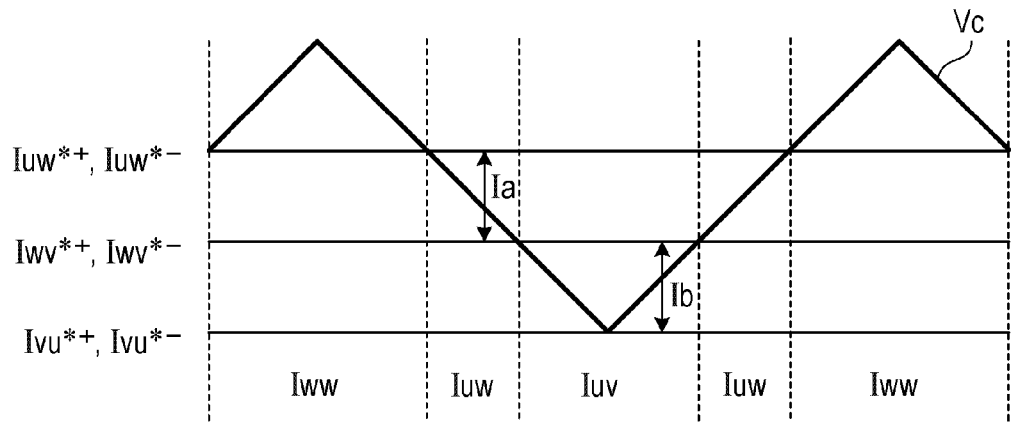
FIG. 29 is a chart illustrating the relationship between the carrier signal and the line to line current commands.

For example, in the region A, when the detected phase voltage Vw is the minimum, the relationship between the carrier signal Vc and the corrected line to line current commands $Iuw^{*+}$, $Iuw^{*-}$, $Ivu^{*+}$, $Ivu^{*-}$, $Iwv^{*+}$, and $Iwv^{*-}$ becomes such as that illustrated in FIG. 29. The line to line current commands $Iuw^{*+}$ and $Iuw^{*-}$ are the same; the line to line current commands $Ivu^{*+}$ and $Ivu^{*-}$ are the same; and the line to line current commands $Iwv^{*+}$ and $Iwv^{*-}$ are the same. In this case, only the zero vector Iww whose corresponding detected phase voltage is less than that of the zero vector Ivv is output in one cycle of the carrier signal Vc.

In this manner, when the output phase whose phase voltage has the minimum absolute value is the phase corresponding to the second zero vector, the current command corrector 31A generates the corrected line to line current commands $Iuw^{*+}$, $Iuw^{*-}$, $Ivu^{*+}$, $Ivu^{*-}$, $Iwv^{*+}$, and $Iwv^{*-}$ by decreasing the line to line current commands Iuw*, Ivu*, and Iwv* until the line to line current command whose value is the minimum among the line to line current commands Iuw*, Ivu*, and Iwv* becomes equal to the bottom value of the carrier signal Vc. Note that the phase corresponding to the second zero vector is an example of a second output phase.

Also, when the amplitude of the output voltage is larger than or equal to the certain value and when the voltage of the phase corresponding to the third zero vector is the minimum, the order of current vectors output in one cycle of the carrier signal Vc is represented as follows in each of the regions A to F. Note that the phase corresponding to the third zero vector is an example of a third output phase.

Iuw→Iuu→Iuv→Iuu→Iuw (region A)
Iuw→Iww→Ivw→Iww→Iuw (region B)
Ivu→Ivv→Ivw→Ivv→Ivu (region C)
Ivu→Iuu→Iwu→Iuu→Ivu (region D)
Iwv→Iww→Iwu→Iww→Iwv (region E)
Iwv→Ivv→Iuv→Ivv→Iwv (region F)

Figure 30:
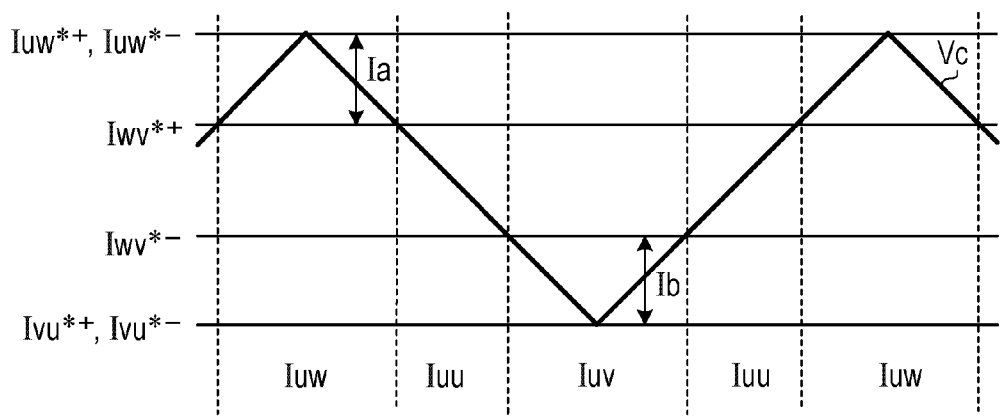
FIG. 30 is a chart illustrating the relationship between the carrier signal and the line to line current commands.

For example, in the region A, when the detected phase voltage Vu is the minimum, the relationship between the carrier signal Vc and the corrected line to line current commands $Iuw^{*+}$, $Iuw^{*-}$, $Ivu^{*+}$, $Ivu^{*-}$, $Iwv^{*+}$, and $Iwv^{*-}$ becomes such as that illustrated in FIG. 30. The line to line current commands $Iuw^{*+}$ and $Iuw^{*-}$ are values obtained by adding the first offset $\Delta Is11$ to the line to line current commands Iuw*. The line to line current commands $Ivu^{*+}$ and $Ivu^{*-}$ are values obtained by adding the second offset $\Delta Is12$ to the line to line current commands Ivu*. Also, the line to line current commands $Iwv^{*+}$ is a value obtained by adding the first offset value $\Delta Is11$ to the line to line current command Iwv*. The line to line current command $Iwv^{*-}$ is a value obtained by adding the second offset value $\Delta Is12$ to the line to line current command Iwv*. The current vectors output in one cycle of the carrier signal Vc are the effective vectors Iuw and Iuv and the zero vector Iuu.

In this manner, when the output phase whose phase voltage has the minimum absolute value is the phase corresponding to the third zero vector, the current command corrector 31A generates the corrected line to line current command obtained by increasing the maximum line to line current command, the corrected line to line current command obtained by decreasing the minimum line to line current command, and the two corrected line to line current command obtained by increasing and decreasing the intermediate line to line current command.

More specifically, the current command corrector 31A generates the corrected line to line current commands by increasing the maximum and intermediate line to line current commands until the maximum line to line current command becomes equal to the peak value of the carrier signal Vc. Also, the current command corrector 31A generates the corrected line to line current commands by decreasing the minimum and intermediate line to line current commands until the minimum line to line current command becomes equal to the bottom value of the carrier signal Vc.

In this manner, the drive signal generator 23A with the logic circuit 35A is capable of outputting three zero vectors in each of the regions A to F in one cycle of the carrier signal Vc, and corrects the line to line current commands Iuw*, Ivu*, and Iwv*. Accordingly, among the multiple zero vectors, a zero vector whose corresponding phase has the minimum absolute value of the phase voltage is output, and the amplitude of the common mode voltage Vcom2 can be reduced.

As described above, the current-source power converting apparatus 1A according to the second embodiment selects, out of the multiple zero vectors, a zero vector whose corresponding phase has the minimum absolute value of the phase voltage in the short circuit mode, and generates switch drive signals on the basis of the selected zero vector. Therefore, the common mode voltage in the short circuit mode can be reduced, and fluctuations of the common mode voltage in transition from the short circuit mode to the output mode can be decreased.

Also in the current-source power converting apparatus 1A, when the amplitude of the output voltage is less than the certain value, current vectors in accordance with current commands are generated using two effective vectors and three zero vectors. Thus, the occurrence of short-width pulses can be suppressed.

In the above-described embodiments, the minimum phase voltage is determined on the basis of the detected phase voltages Vu, Vv, and Vw. However, the method of determining the minimum phase voltage is not limited to this. For example, when the power factor is 1, the phase angles of the phase current commands Iu*, Iv*, and Iw* respectively coincide with those of the detected phase voltages Vu, Vv, and Vw. Therefore, the minimum phase voltage may be determined on the basis of the large/small relationship among the phase current commands Iu*, Iv*, and Iw*. Alternatively, even when the power factor is not 1, the minimum phase voltage may be determined on the basis of the phase state of any one of the phase current commands Iu*, Iv*, and Iw*. Alternatively, the voltage between the U-phase and the V-phase and the voltage between the V-phase and the W-phase may be detected, and the minimum phase voltage may be determined on the basis of the detection results.

Also, in the above-described embodiments, the minimum phase voltage is determined. Alternatively, the minimum phase current may be determined. For example, instantaneous values of current flowing in the U-phase, V-phase, and W-phase (hereinafter described as phase current instantaneous values) are detected. A zero vector corresponding to the minimum phase current instantaneous value among the phase current instantaneous values of the U-phase, V-phase, and W-phase is selected, and switch drive signals are generated on the basis of the selected zero vector. When the power factor is 1, the phase angles of the phase voltages respectively coincide with those of the phase currents. Therefore, as in the case where the zero vector corresponding to the minimum phase voltage is selected, the common mode voltage in the short circuit mode can be reduced. Alternatively, even when the power factor is not 1, the minimum phase current may be eventually determined on the basis of the phase differences between the phase currents and the phase voltages. Also in this case, as in the case where the zero vector corresponding to the minimum phase voltage is selected, the common mode voltage in the short circuit mode can be reduced. Alternatively, since current flows in the U-phase, V-phase, and W-phase so as to coincide with the phase current commands Iu*, Iv*, and Iw*, the zero vector corresponding to the minimum phase current command among the phase current commands Iu*, Iv*, and Iw* may be selected, and switch drive signals may be generated on the basis of the selected zero vector.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

It should be understood by those skilled in the art that various modifications, combinations, sub-combinations and alterations may occur depending on design requirements and other factors insofar as they are within the scope of the appended claims or the equivalents thereof.

What is claimed is:

1. A current-source power converting apparatus comprising:
    an inverter including, in every output phase, a plurality of switching elements that are serially connected between a positive pole and a negative pole of a direct current source; and
    a drive controller that controls the inverter in accordance with a current command in an output mode of controlling the switching elements of different output phases for supplying current between the output phases, and a short circuit mode of controlling the switching elements of the same output phase,
    wherein the output phase in which the drive controller executes the short circuit mode is, among the output phases, the output phase whose phase voltage or phase current has a minimum absolute value,
    wherein the drive controller includes
        a voltage detector that detects voltages of the individual output phases, and
        a determiner that determines, on the basis of the voltages detected by the voltage detector, the output phase with a minimum absolute value of a phase voltage,
    wherein the output phase in which the drive controller executes the short circuit mode is the output phase determined by the determiner to be the output phase with the minimum absolute value of the phase voltage,
    wherein the drive controller includes
        a carrier signal generator that generates a carrier signal,
        a current command generator that generates, as the current command, a plurality of line to line current commands for different output inter-phases,
        a line current command corrector that corrects the line to line current commands in accordance with the output phase determined by the determiner to be the output phase whose phase voltage has the minimum absolute value, and outputs the corrected line to line current commands,
        a comparator that compares the carrier signal output from the carrier signal generator with the corrected line to line current commands output from the line current command corrector and generates pulse width modulated signals, and
        a signal generator that generates, on the basis of the pulse width modulated signals output from the comparator, drive signals for controlling the plurality of switching elements and executing the short circuit mode,
    wherein the drive controller determines two different output phases of a first output phase being a target of the short circuit mode when the carrier signal is smaller than all the corrected line to line current commands and a second output phase being a target of the short circuit mode when the carrier signal is larger than all the corrected line to line current commands, and
    wherein the line current command corrector generates the corrected line to line current commands by increasing or decreasing the plurality of line to line current commands in accordance with the output phase determined to be the output phase with the minimum absolute value of the phase voltage.

2. The current-source power converting apparatus according to claim 1, wherein the line current command corrector generates the corrected line to line current commands by increasing, when the output phase determined to be the output phase with the minimum absolute value of the phase voltage is the first output phase, the plurality of line to line current commands until a maximum line to line current command among the plurality of line to line current commands becomes equal to a peak value of the carrier signal.

3. The current-source power converting apparatus according to claim 1, wherein the line current command corrector generates the corrected line to line current commands by decreasing, when the output phase determined to be the output phase with the minimum absolute value of the phase voltage is the second output phase, the plurality of line to line current commands until a minimum line to line current among the plurality of line to line current commands becomes equal to a bottom value of the carrier signal.

4. The current-source power converting apparatus according to claim 1,
    wherein the drive controller has the short circuit mode for a third output phase different from the first output phase or the second output phase in a state in which the carrier signal is within a range between a value that is greater than, among the plurality of line to line current commands, a line to line current command whose value is intermediate and that is less than a line to line current command whose value is maximum, and a value that is less than the line to line current command whose value is intermediate and that is larger than a line to line current command whose value is minimum, and wherein the line current command corrector generates, when the output phase determined to be the output phase with the minimum absolute value of the phase voltage is the third output phase, two corrected line to line current commands by increasing/decreasing a corrected line to line current command obtained by increasing the line to line current command whose value is maximum, a corrected line to line current command obtained by decreasing the line to line current command whose value is minimum, and the line to line current command whose value is intermediate.

5. The current-source power converting apparatus according to claim 4, wherein the line current command corrector generates the plurality of corrected line to line current commands by increasing the line to line current commands whose values are maximum and intermediate until the line to line current command whose value is maximum becomes equal to a peak value of the carrier signal, and by decreasing the line to line current commands whose values are minimum and intermediate until the line to line current command whose value is minimum becomes equal to a bottom value of the carrier signal.

6. The current-source power converting apparatus according to claim 1,
wherein the drive controller includes an output amplitude determiner that determines whether a voltage amplitude of the output phase is larger than or equal to a certain value, and
wherein, when the output amplitude determiner determines that the voltage amplitude is larger than or equal to the certain value, the output phase in which the short circuit mode is executed is the output phase determined by the determiner to be the output phase with the minimum absolute value of the phase voltage.

7. A current-source power converting apparatus comprising:
an inverter including, in every output phase, a plurality of switching elements that are serially connected between a positive pole and a negative pole of a direct current source; and
a drive controller that controls the inverter in accordance with a current command in an output mode of controlling the switching elements of different output phases for supplying current between the output phases, and a short circuit mode of controlling the switching elements of the same output phase,
wherein the output phase in which the drive controller executes the short circuit mode is, among the output phases, the output phase whose phase voltage or phase current has a minimum absolute value,
wherein the drive controller includes
a voltage detector that detects voltages of the individual output phases, and
a determiner that determines, on the basis of the voltages detected by the voltage detector, the output phase with a minimum absolute value of a phase voltage,
wherein the output phase in which the drive controller executes the short circuit mode is the output phase determined by the determiner to be the output phase with the minimum absolute value of the phase voltage,
wherein the drive controller includes
a carrier signal generator that generates a carrier signal,
a current command generator that generates, as the current command, a plurality of line to line current commands for different output inter-phases,
a line current command corrector that corrects the line to line current commands in accordance with the output phase determined by the determiner to be the output phase whose phase voltage has the minimum absolute value, and outputs the corrected line to line current commands
a comparator that compares the carrier signal output from the carrier signal generator with the corrected line to line current commands output from the line current command corrector and generates pulse width modulated signals, and
a signal generator that generates, on the basis of the pulse width modulated signals output from the comparator, drive signals for controlling the plurality of switching elements and executing the short circuit mode,
wherein the drive controller includes an output amplitude determiner that determines whether a voltage amplitude of the output phase is larger than or equal to a certain value,
wherein, when the output amplitude determiner determines that the voltage amplitude is larger than or equal to the certain value, the output phase in which the short circuit mode is executed is the output phase determined by the determiner to be the output phase with the minimum absolute value of the phase voltage, and
wherein, when the output amplitude determiner determines that the voltage amplitude is less than the certain value, the line current command corrector does not correct the line to line current commands, and outputs the line to line current commands as corrected line to line current commands.

8. A current-source power converting apparatus comprising:
an inverter including, in every output phase, a plurality of switching elements that are serially connected between a positive pole and a negative pole of a direct current source; and
a drive controller that controls the inverter in accordance with a current command in an output mode of controlling the switching elements of different output phases for supplying current between the output phases, and a short circuit mode of controlling the switching elements of the same output phase,
wherein the output phase in which the drive controller executes the short circuit mode is, among the output phases, the output phase whose phase voltage or phase current has a minimum absolute value,
wherein the drive controller includes:
a carrier signal generator that is configured to generate a carrier signal;
a current command generator that is configured to generate, as the current command, a plurality of line to line current commands for different output inter-phases; and
a line current command corrector that is configured to correct the line to line current commands in accordance with the output phase whose phase voltage has the minimum absolute value, and outputs the corrected line to line current commands, wherein the drive controller is configured to determine two different output phases of a first output phase being a target of the short circuit mode when the carrier signal is smaller than all the corrected line to line current commands and a second output phase being a target of the short circuit mode when the carrier signal is larger than all the corrected line to line current commands, and wherein the line current command corrector is configured to generate the corrected line to line current commands by increasing or decreasing the plurality of line to line current commands in accordance with the output phase with the minimum absolute value of the phase voltage.

9. A current-source power converting apparatus comprising:

an inverter including, in every output phase, a plurality of switching elements that are serially connected between a positive pole and a negative pole of a direct current source; and a drive controller that controls the inverter in accordance with a current command in an output mode of controlling the switching elements of different output phases for supplying current between the output phases, and a short circuit mode of controlling the switching elements of the same output phase, wherein the output phase in which the drive controller executes the short circuit mode is, among the output phases, the output phase whose phase voltage or phase current has a minimum absolute value, wherein the drive controller includes:
a carrier signal generator that is configured to generate a carrier signal;
a current command generator that is configured to generate, as the current command, a plurality of line to line current commands for different output inter-phases;
a line current command corrector that is configured to correct the line to line current commands in accordance with the output phase whose phase voltage has the minimum absolute value, and outputs the corrected line to line current commands; and
an output amplitude determiner that is configured to determine whether a voltage amplitude of the output phase is larger than or equal to a certain value, wherein, when the output amplitude determiner determines that the voltage amplitude is larger than or equal to the certain value, the output phase in which the short circuit mode is executed is the output phase with the minimum absolute value of the phase voltage, and wherein, when the output amplitude determiner determines that the voltage amplitude is less than the certain value, the line current command corrector does not correct the line to line current commands, and outputs the line to line current commands as corrected line to line current commands.

10. A current-source power converting apparatus comprising:

inverting means including, in every output phase, a plurality of switching elements that are serially connected between a positive pole and a negative pole of a direct current source; and drive controlling means for controlling the inverting means in accordance with a current command in an output mode of controlling the switching elements of different output phases for supplying current between the output phases, and a short circuit mode of controlling the switching elements of the same output phase, wherein the output phase in which the drive controlling means executes the short circuit mode is, among the output phases, the output phase whose phase voltage or phase current has a minimum absolute value, wherein the drive controlling means includes:
a carrier signal generating means for generating a carrier signal;
a current command generating means for generating, as the current command, a plurality of line to line current commands for different output inter-phases; and
a line current command correcting means for correcting the line to line current commands in accordance with the output phase whose phase voltage has the minimum absolute value, and outputs the corrected line to line current commands, wherein the drive controlling means determines two different output phases of a first output phase being a target of the short circuit mode when the carrier signal is smaller than all the corrected line to line current commands and a second output phase being a target of the short circuit mode when the carrier signal is larger than all the corrected line to line current commands, and wherein the line current command correcting means generates the corrected line to line current commands by increasing or decreasing the plurality of line to line current commands in accordance with the output phase with the minimum absolute value of the phase voltage.

11. A current-source power converting apparatus comprising:

inverting means including, in every output phase, a plurality of switching elements that are serially connected between a positive pole and a negative pole of a direct current source; and drive controlling means for controlling the inverting means in accordance with a current command in an output mode of controlling the switching elements of different output phases for supplying current between the output phases, and a short circuit mode of controlling the switching elements of the same output phase, wherein the output phase in which the drive controlling means executes the short circuit mode is, among the output phases, the output phase whose phase voltage or phase current has a minimum absolute value, wherein the drive controlling means includes:
a carrier signal generating means for generating a carrier signal;
a current command generating means for generating, as the current command, a plurality of line to line current commands for different output inter-phases;
a line current command correcting means for correcting the line to line current commands in accordance with the output phase whose phase voltage has the minimum absolute value, and outputs the corrected line to line current commands; and
an output amplitude determining means for determining whether a voltage amplitude of the output phase is larger than or equal to a certain value, wherein, when the output amplitude determining means determines that the voltage amplitude is larger than or equal to the certain value, the output phase in which the short circuit mode is executed is the output phase with the minimum absolute value of the phase voltage, and wherein, when the output amplitude determining means determines that the voltage amplitude is less than the certain value, the line current command correcting means does not correct the line to line current commands, and outputs the line to line current commands as corrected line to line current commands.

* * * * *